US012777386B2

(12) United States Patent
Chandrashekar et al.

(10) Patent No.: US 12,777,386 B2
(45) Date of Patent: Oct. 27, 2026

(54) CANDIDATE/TARGET GNODEB-DU DURING LAYER (L1/L2) TRIGGERED MOBILITY (LTM)

(71) Applicant: RAKUTEN SYMPHONY, INC., Tokyo (JP)

(72) Inventors: Subramanya Chandrashekar, Karnataka (IN); Raghavendra Madanahally Ramakrishna, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 235 days.

(21) Appl. No.: 18/579,864

(22) PCT Filed: Dec. 7, 2023

(86) PCT No.: PCT/US2023/082827

§ 371 (c)(1),
(2) Date: Jan. 17, 2024

(87) PCT Pub. No.: WO2024/205666

PCT Pub. Date: Oct. 3, 2024

(65) Prior Publication Data

US 2025/0081058 A1 Mar. 6, 2025

(30) Foreign Application Priority Data

Mar. 27, 2023 (IN) ............................. 202321021822
Oct. 27, 2023 (IN) ............................. 202321021822

(51) Int. Cl.
*H04W 36/08* (2009.01)
*H04W 36/00* (2009.01)
*H04W 74/0833* (2024.01)

(52) U.S. Cl.
CPC ....... *H04W 36/08* (2013.01); *H04W 36/0058* (2018.08); *H04W 74/0833* (2013.01)

(58) Field of Classification Search
CPC ............. H04W 36/08; H04W 36/0058; H04W 74/0833; H04W 36/0061; H04W 88/085;
(Continued)

(56) References Cited

U.S. PATENT DOCUMENTS

2020/0350974 A1 11/2020 Kim et al.
2022/0070940 A1* 3/2022 Taherzadeh Boroujeni ................ H04B 7/06958

(Continued)

OTHER PUBLICATIONS

Samsung, Discussion on potential enhancement before LTM cell switch, 3GPP TSG-RAN WG2 Meeting #121, Athens, Greece, Feb. 27-Mar. 3, 2023, R2-2301325, 5 Pages (Year: 2022).*
NEC, L1 Measurement Report for Cell Switch, 3GPP TSG-RAN WG2 Meeting #121, Athens, Greece, Feb. 27-Mar. 3, 2023, R2-23002, 3 Pages (Year: 2023).*
LS on L1 measurement RS configuration and PDCCH ordered RACH for LTM. 3GPP TSG RAN WG1 #112 R1-2302194 Athens, Greece, Feb. 27-Mar. 3, 2023. 4 Pages. (Year: 2023).*

(Continued)

*Primary Examiner* — Liem H. Nguyen
(74) *Attorney, Agent, or Firm* — HAUPTMAN HAM, LLP

(57) ABSTRACT

The present disclosure describes techniques for delivery of layer 1 measurements to target gNodeB-DU during layer (L1/L2) triggered mobility (LTM). In one aspect, a method comprises receiving a Physical Downlink Control Channel (PDCCH) order to perform uplink synchronization with at least one LTM candidate cell of at least one candidate gNB-DU. The method further comprises transmitting, in a Random Access Channel (RACH) Request message, an indication to send L1 measurement report along with RACH preamble, to the at least one LTM candidate gNB-DU serving the at least one LTM candidate cell. The method finally comprises receiving, a Random Access Response (RAR) message along with an uplink (UL) scheduling grant to send L1 measurement report to the at least one LTM candidate gNB-DU and transmitting the L1 measurement (Continued)

report to the at least one LTM candidate gNB-DU, in response to receipt of the UL scheduling grant in the RAR message.

20 Claims, 8 Drawing Sheets

(58) Field of Classification Search
CPC ......... H04W 36/0072; H04W 36/0085; H04W 36/085; H04W 36/30
See application file for complete search history.

(56) References Cited

U.S. PATENT DOCUMENTS

2024/0007531 A1* 1/2024 Kiilerich Pratas ...... H04L 67/12
2024/0259891 A1* 8/2024 Majumdar ........ H04W 36/0058
2025/0175864 A1* 5/2025 Kim .................. H04W 36/0077
2025/0358692 A1* 11/2025 Huang .............. H04W 36/0077

OTHER PUBLICATIONS

Discussion on cell switch for LTM. 3GPP TSG-RAN WG2 Meeting #121 R2-2300653 Athens, Greece, Feb. 27-Mar. 3, 2023. 4 Pages. (Year: 2023).*
Cell switch for L1/L2 triggered mobility. 3GPP TSG-RAN WG2 Meeting #121 R2-2301027 Athens, Greece, Feb. 27-Mar. 3, 2023. 5 Pages. (Year: 2023).*
Discussion on measurement enhancement of L1L2 triggered mobility. 3GPP TSG-RAN WG2 Meeting #121 R2-2301593 Athens, Greece, Feb. 27-Mar. 3, 2023. 3 Pages. (Year: 2023).*
Discussion on cell switch delay requirements in R18 L1L2-triggered mobility. 3GPP TSG-RAN WG4 Meeting #106 R4-2301706 Athens, Greece, Feb. 27-Mar. 3, 2023. 5 Pages. (Year: 2023).*
NEC, "L1 Measurement Report for Cell Switch", 3GPP TSG-RAN WG2 Meeting #121, Feb. 16, 2023, pp. 1-3, Athens, Greece, 3pp.
Samsung, "Discussion on potential enhancement before LTM cell switch", 3GPP TSG-RAN WG2 Meeting #121, Feb. 17, 2023, pp. 1-5, Athens, Greece, 5pp.

* cited by examiner

CANDIDATE/TARGET GNODEB-DU DURING LAYER (L1/L2) TRIGGERED MOBILITY (LTM)

CROSS-REFERENCE TO RELATED APPLICATION

This application is a National Phase of International Application No. PCT/US2023/082827, filed Dec. 7, 2023, which claims priority to Indian Provisional Application No. 202321021822, filed on Mar. 27, 2023, and Non-Provisional Application No. 202321021822, filed on Oct. 27, 2023, the disclosure of which is incorporated by reference herein in its entirety.

TECHNICAL FIELD

The embodiments disclosed herein generally relate to the field of wireless communication, and more particularly, to a method and system for delivery of Layer1 (L1) measurements to target gNodeB-Distributed Unit (gNB-DU) during Layer1/Layer2 (L1/L2) Triggered Mobility (LTM).

BACKGROUND

The Fifth Generation (5G) New Radio (NR) is a wireless communication standard that defines a physical layer and a protocol stack for a fifth generation of mobile networks (5G). 5G NR operates on multiple frequency bands, allowing for wider coverage and higher data rates. Open Radio Access Networks (ORAN) are cloud-native, centralized cellular network architecture that provides great benefits in network scalability and performance. The Open RAN disaggregates traditional monolithic, single-vendor radio access networks (RAN) into a distributed unit (DU), centralized unit (CU) and radio unit (RU) and connects these elements using open standard interfaces. Disaggregation allows the operator to virtualize the CU and DU components and run them on commercial off the shelf (COTS) servers.

L1/L2 Triggered Mobility (LTM) is fundamentally different from the traditional or legacy Layer 3 Mobility in terms of its execution. Layer 3 Mobility or the baseline mobility or legacy mobility concept, revolves around network configuring the User Equipment (UE) with RRC measurements or layer 3 measurements, and then the network using those measurements to prepare the candidates/target cells and subsequently sending cell switch command to the UE. The target cell configuration and the cell switch command are provided to instruct a DU of gNB to handover the UE to the target cell. For LTM, a UE may be configured for lower layer mobility, such as Layer 1 (L1)/Layer 2 (L2) mobility, where the UE may perform lower layer cell switch procedures so that the UE may dynamically perform a cell switch procedure to a cell in the same or neighboring base station distributed unit i.e. gNB-DU.

In traditional cell switch, the UE waits for Physical Random-Access Channel (PRACH) occasion and performs RACH to synchronize with the uplink (UL) of the target cell. This is necessary as the timing advance of the target cell (configured for cell switch) could be different from that of the serving cell. During the RACH procedure, the UE acquires the Timing Advance (TA) for the target cell.

The agreements in RANI from the RANI #112 meeting proposes delivery of L1 measurements to the target/candidate gNB-DU, issuance of PDCCH order from serving gNB-DU to UE to perform UL sync with the target/candidate cell before serving cell change, and Random Access Response from the target/candidate gNB-DU can be configured to be received at the UE. Serving gNB-DU issues a PDCCH order to the UE to perform Random Access(RA) procedure to acquire UE's Timing Advance (TA) at the target cell. The UE performing RA procedure can be considered as an approximate indication of UE's mobility towards a candidate cell.

The above proposal of sending serving gNB-DU configured L1 measurement report to target/candidate gNB-DU(s) while the UE is still connected to the serving gNB-DU (before LTM cell switch) serves as an indication of an incoming UE (due to an LTM cell switch), based on which resource reservation for a UE can be optimized. The L1 measurement report sent to target/candidate gNB-DU(s) provides an approximate indication of the UE's mobility towards the target/candidate gNB-DU. This may also allow the target/candidate gNB-DU(s) to re-assign PRACH preambles corresponding to the best beam/beam-group as perceived by the UE and re-configure or modify any other resources already assigned to the UE at the time of target cell preparation.

However, the UE requires UL scheduling grants from the LTM target/candidate gNB-DU and the UE is also required to perform RACH and gain target cell Timing alignment information, before the UE can send an L1 measurement report to the target/candidate gNB-DU. Further, the UE sending L1 measurements to all the LTM candidate gNB-DU(s) serving the LTM candidate cells is an overhead and waste of UL resources, as every LTM candidate cell may not eventually turn out to be an LTM target cell (to which the UE eventually undergoes serving cell change). Hence, sending L1 measurement reports to all candidate cells is sub-optimal.

Further, the UE cannot perform UL data scheduling with the serving cell/gNB-DU, while it is sending L1 measurement report to a candidate/target gNB-DU, which impacts UL data rate. The UL scheduling grants allocated by target gNB-DU to the UE is valuable and cannot be repeated often, due to the associated overhead in signaling the grants from target gNB-DU. Hence, the allocated grants should be utilized judiciously i.e. the timing to send such an L1 measurement report should be properly identified and optimized.

Thus, if the L1 measurement reports are to be delivered to the target/candidate gNB-DU(s) before the L1/L2 Triggered Mobility (LTM) serving cell change, in the disaggregated gNB architecture, a new mechanism is needed in which the scheduling grants configuration needs to be available at the UE, whenever the L1 measurement report is expected to be delivered to the target gNB-DU.

Therefore, there exists a need in the art to provide a technique/mechanism which overcomes the above-mentioned problems by providing delivery of layer 1 measurements to target gNB-DU during LTM without any additional signaling and without compromising on the UL data scheduling with the serving cell/gNB-DU.

SUMMARY

The transmission of the serving gNB-DU configured L1 measurement report to target/candidate gNB-DU(s) while the UE is still connected to the serving gNB-DU allow the target/candidate gNB-DU(s) to re-assign PRACH preambles corresponding to the best beam/beam-group as perceived by the UE and/or to re-configure or modify any other radio resources already assigned to the UE at the time of target cell preparation. However, the UE requires UL scheduling grants from the LTM target/candidate gNB-DU before the transmission of the L1 measurement report to the target/candidate gNB-DU. The acquisition of the UL scheduling grants from the LTM target/candidate gNB-DU results in overhead due to additional signaling and UE also need to compromise on the UL data scheduling with the serving cell/gNB-DU. Further, the UE sending L1 measurements to all the LTM candidate gNB-DU(s) serving the LTM candidate cells is an overhead and waste of UL resources, as every LTM candidate cell may not eventually turn out to be an LTM target cell (to which the UE eventually undergoes serving cell change). Hence, sending L1 measurement reports to all candidate cells is not an optimal solution.

In one non-limiting aspect of the present disclosure, a method for delivery of layer 1 measurements to target gNodeB-DU during layer (L1/L2) triggered mobility (LTM) is disclosed. The method discloses receiving, from a gNodeB Distributed Unit (gNB-DU) serving a user equipment (UE) in a current serving cell, a Physical Downlink Control Channel (PDCCH) order to perform uplink synchronization with at least one LTM candidate cell of at least one candidate gNB-DU. The method further discloses transmitting, in a Random Access Channel (RACH) Request message, an indication to send L1 measurement report along with RACH preamble, to the at least one LTM candidate gNB-DU serving the at least one LTM candidate cell. The method also disclosed receiving, a Random Access Response (RAR) message along with an uplink (UL) scheduling grant, to send L1 measurement report to the at least one LTM candidate gNB-DU, either directly from the at least one LTM candidate gNB-DU or via the serving gNB-DU. Finally, the method discloses transmitting the L1 measurement report to the at least one LTM candidate gNB-DU, in response to receipt of the UL scheduling grant in the RAR message. Alternatively, any other similar L2 or L1 message could be used to deliver the scheduling grant to the UE.

In another non-limiting aspect of the present disclosure, an apparatus for delivery of layer 1 measurements to target gNodeB-DU during layer (L1/L2) triggered mobility (LTM) is disclosed. The apparatus comprising at least one processor and a memory communicatively coupled to the at least one processor. The memory is configured to store processor-executable instructions, which, on execution, cause the at least one processor to receive, from a gNodeB Distributed Unit (gNB-DU) serving a user equipment (UE) in a current serving cell, a Physical Downlink Control Channel (PDCCH) order to perform uplink synchronization with at least one LTM candidate cell of at least one candidate gNB-DU. The stored processor-executable instructions, upon execution, further cause the at least one processor to transmit, in a Random Access Channel (RACH) Request message, an indication to send L1 measurement report along with RACH preamble, to the at least one LTM candidate gNB-DU serving the at least one LTM candidate cell. The stored processor-executable instructions, upon execution, also cause the at least one processor to receive, a Random Access Response (RAR) message along with an uplink (UL) scheduling grant, to send L1 measurement report to the at least one LTM candidate gNB-DU, either directly from the at least one LTM candidate gNB-DU or via the serving gNB-DU. The stored processor-executable instructions, upon execution, finally cause the at least one processor to transmit the L1 measurement report to the at least one LTM candidate gNB-DU, in response to receipt of the UL scheduling grant in the RAR message. Alternatively, any other similar L2 or L1 message could be used to deliver the scheduling grant to the UE.

In yet another non-limiting aspect of the present disclosure, a non-transitory computer-readable medium for delivery of layer 1 measurements to target gNodeB-DU during layer (L1/L2) triggered mobility (LTM) is disclosed. The non-transitory computer-readable medium having computer-readable instructions that when executed by a processor causes the processor to perform operations of obtaining, from a gNodeB Distributed Unit (gNB-DU) serving a user equipment (UE) in a current serving cell, a Physical Downlink Control Channel (PDCCH) order to perform uplink synchronization with at least one LTM candidate cell of at least one candidate gNB-DU. The computer-readable instructions when executed by the processor further causes the processor to perform operation of transmitting, in a Random Access Channel (RACH) Request message, an indication to send L1 measurement report along with RACH preamble, to the at least one LTM candidate gNB-DU serving the at least one LTM candidate cell. The computer-readable instructions when executed by the processor further causes the processor to perform operation of obtaining, a Random Access Response (RAR) message along with an uplink (UL) scheduling grant, to send L1 measurement report to the at least one LTM candidate gNB-DU, either directly from the at least one LTM candidate gNB-DU or via the serving gNB-DU. The computer-readable instructions when executed by a processor finally causes the processor to perform operation of transmitting the L1 measurement report to the at least one LTM candidate gNB-DU, in response to receipt of the UL scheduling grant in the RAR message.

The foregoing summary is illustrative only and is not intended to be in any way limiting. In addition to the illustrative aspects, aspects, and features described above, further aspects and features will become apparent by reference to the drawings and the following detailed description.

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below, are incorporated in and form part of the specification, and serve to further illustrate the aspects and explain various principles and advantages, in accordance with the present disclosure wherein.

Figure 1:
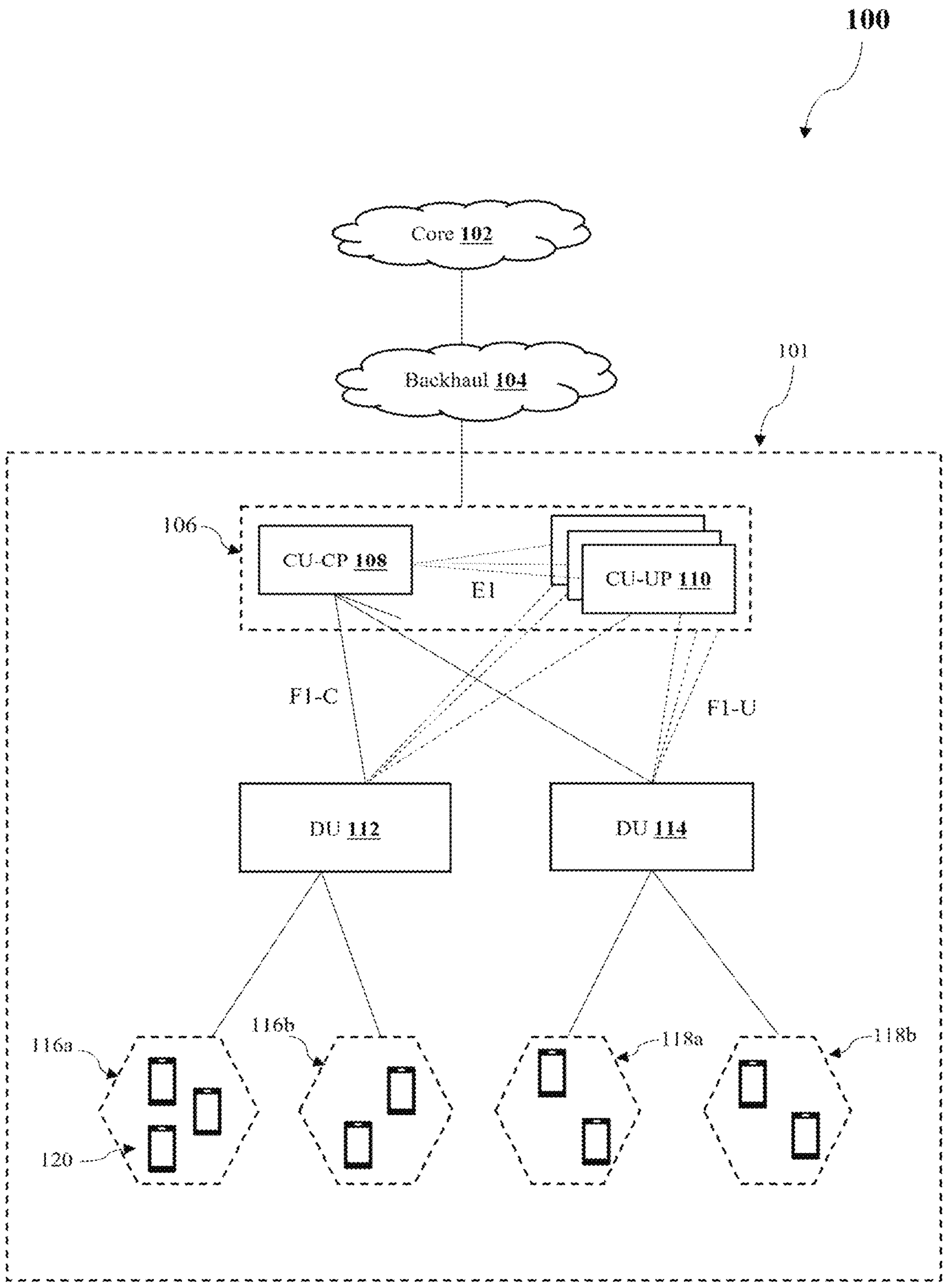
FIG. 1 shows an exemplary aspect of Radio Access Network (RAN) communication system 100 with disaggregated gNB architecture, in accordance with some aspects of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any aspect or implementation of the present disclosure described herein as "exemplary" is not necessarily to be construed as preferred or advantageous over other aspects.

While the disclosure is susceptible to various modifications and alternative forms, specific aspects thereof have been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus preceded by "comprises . . . a" does not, without more constraints, preclude the existence of other elements or additional elements in the system.

The terms like "at least one" and "one or more" may be used interchangeably throughout the description. The terms like "a plurality of" and "multiple" may be used interchangeably throughout the description. The terms like "distributed unit", "distributed unit entity", "DU", and "vDU" may be used interchangeably throughout the description. The terms like "central unit control plane", "CU-CP", "CU-CP entity", and "vCU-CP" may be used interchangeably throughout the description. The terms like "central unit user plane", "CU-UP", "CU-UP entity" and "vCU-UP" may be used interchangeably throughout the description.

The terms like "COTS" and "commercial off the shelf server" may be used interchangeably throughout the description. The terms like "network operator", "operator", and "service provider" may be used interchangeably throughout the description. The terms like "L1/L2 triggered mobility" and "LTM" may be used interchangeably throughout the description. The terms like "Timing Advance" and "TA" may be used interchangeably throughout the description. The terms like "Timing Advance Alignment Timer", "Time_Alignment_Timer", and "TA Alignment Timer" may be used interchangeably throughout the description. The terms "cell switch" and "handover" may be used interchangeably throughout the description. The terms like "candidate gNB-DU" and "target gNB-DU" may be used interchangeably throughout the description. The terms like "candidate cell" and "target cell" may be used interchangeably throughout the description. It is to be appreciated that the interchangeable terms disclosed in foregoing paragraphs may be used repeatedly throughout the disclosure. However, the same shall not be construed limiting the scope of the present disclosure in any sense.

In the following detailed description of the aspects of the disclosure, reference is made to the accompanying drawings that form a part hereof, and in which are shown by way of illustration of specific aspects in which the disclosure may be practiced. These aspects are described in sufficient detail to enable those skilled in the art to practice the disclosure, and it is to be understood that other aspects may be utilized and that changes may be made without departing from the scope of the present disclosure. The following description is, therefore, not to be taken in a limiting sense. In the following description, well known functions or constructions are not described in detail since they would obscure the description with unnecessary detail.

The disaggregated architecture of gNB as defined in 3GPP decomposes the gNB into multiple logical entities such as one or more CUs and one or more DUs. Likewise, a single DU may host multiple cells (max of 512 in current specifications). The CU may be further partitioned into a control-plane entity (CU-CP) and one or more user-plane entities (CU-UPs). The gNB-CU-CP hosts the Packet Data Convergence Protocol (PDCP) and Radio Resource Control (RRC) layers, while the gNB-DU hosts the Radio link Control (RLC)/Media Access Control (MAC) and Physical (PHY) layers. The scheduling operation takes place at the gNB-DU.

When the UE moves from the coverage area of one cell to another cell, at some point a serving cell change needs to be performed. Currently serving cell change is triggered by L3 measurements and is done by RRC signaling triggered reconfiguration with synchronization for cell change, when applicable. In such scenario, complete L2 and L1 gets reset. Complete L2/L1 reset means complete change in L1, L2 configuration of the cell at the UE. This leads to longer latency, larger overhead, and longer interruption time than beam switch mobility.

In this regard, 3$^{rd}$ Generation Partnership Project (3GPP) continues to add functionality in Release 18 to enhance 5G performance by working in the areas of network energy savings, coverage, mobility support, MIMO evolution, multicast and broadcast service (MBS), and positioning. The objectives of the mobility enhancement Release 18 work item is to specify mechanism and procedures of L1/L2 based inter-cell mobility for mobility latency reduction. The L1/L2 mobility enhancements have been proposed to enable a serving cell change via L1/L2 signaling, in order to reduce the latency, overhead, and interruption time. Those skilled in the art will appreciate that L1/L2-triggered mobility (LTM) is a procedure in which a gNB receives L1 measurement reports from UEs, and on their basis the gNB changes UEs' serving cell(s) through MAC CE. The L1 measurement involves Inter cell beam forming (ICBM), which does not require complete L2/L1 reset.

If this L1 measurement report is transmitted to the target/candidate gNB-DU(s) while the UE is still connected to the serving gNB-DU allows the target/candidate gNB-DU(s) to re-assign PRACH preambles corresponding to the best beam/beam-group as perceived by the UE and to re-configure or modify any other resources already assigned to the UE at the time of target cell preparation. However, the UE requires specific UL scheduling grant from the respective LTM target/candidate gNB-DU before its transmits the L1 measurement report to the target/candidate gNB-DU. The UL scheduling grants from the LTM target/candidate gNB-DU is usually acquired by additional signaling from the UE, which adds to the overhead and latency. Further, the UE sending L1 measurements to all the LTM candidate gNB-DU(s) serving the LTM candidate cells is an overhead and waste of UL resources, as every LTM candidate cell may not eventually turn out to be an LTM target cell (to which the UE eventually undergoes serving cell change).

In one non-limiting aspect of the present disclosure, a method for delivery of layer 1 measurements to target gNB-DU during LTM is disclosed. The method discloses receiving, from a gNodeB Distributed Unit (gNB-DU) serving a user equipment (UE) in a current serving cell, a Physical Downlink Control Channel (PDCCH) order to perform uplink synchronization with at least one LTM candidate cell of at least one candidate gNB-DU. The method further discloses transmitting, in a Random Access Channel (RACH) Request message, an indication to send L1 measurement report along with RACH preamble, to the at least one LTM candidate gNB-DU serving the at least one LTM candidate cell. The method also disclosed receiving, a Random Access Response (RAR) message along with an uplink (UL) scheduling grant to send L1 measurement report to the at least one LTM candidate gNB-DU, either directly from the at least one LTM candidate gNB-DU or via the serving gNB-DU. Finally, the method discloses transmitting the L1 measurement report to the at least one LTM candidate gNB-DU, in response to receipt of the UL scheduling grant in the RAR message.

To understand the above solution in detail, one first needs to understand the disaggregated gNB architecture discussed in detail below with reference to FIG. 1. FIG. 1 which shows an exemplary aspect of radio access network (RAN) communication system 100 comprising a 5G New Radio (NR) base station system (also referred to as a “gNodeB” or “gNB”) 101, in accordance with some aspects of the present disclosure. Although FIG. 1 is described in the context of a 5G architecture in which the base station is partitioned into multiple logical entities, it is to be understood that the techniques described here can be used with other wireless interfaces for example, 4G LTE. In an exemplary aspect, the gNB 101 may be configured to provide wireless services to the at least one user equipment (UE) 120 present in cells 116*a*, 116*b*, 118*a*, or 118*a* served by the gNB 101. However, the number of cells is not limited to the above example and gNB 101 may comprise more cells than discussed in above example.

The at least one UE may be any mobile or non-mobile computing device including, but not limited to, a phone (e.g., a cellular phone or smart phone), a pager, a laptop computer, a desktop computer, a wireless handset, a portable communication device, a portable computing device (e.g., a personal data assistant), an entertainment device (e.g., a music or video device, or a satellite radio), a global positioning system device, or any other suitable computing device including a wired or wireless communications interface. In some aspects of the present disclosure, the at least one UE may be Internet-of-Things (IoT)-enabled device including, but not limited to, vehicles configured to communicate with the gNB 101 or a core network.

As shown, the gNB 101 may be partitioned into a central unit (CU) 106 and one or more distributed units (Dus) 112 and 114. In such a configuration, the CU 106 is configured to serve the DU 112 and DU 114, and the DUs 112 and 114 are configured to serve the one or more UE 120. In the aspect of FIG. 1, the CU 106 may be further partitioned into a control-plane entity (CU-CP) 108 and one or more user-plane entities (CU-UPs) 110 that may handle the control-plane and user-plane processing of the CU 106, respectively. The CU-CP 108 is communicatively coupled with each of the CU-UPs 110 via an E1 interface. The CU-CP 108 is communicatively coupled with each of the DUs 112 and 114 via an F1-C interface. Each of the DUs 112 and 114 may be communicatively coupled to each of the CU-UPs 110 via an F1-U interface.

In one non-limiting aspect, the CU and DU functions may run as virtual software functions on standard commercial off-the-shelf (COTS) server. In such a case, the CU-CP entity 108 may also be referred to as a “vCU-CP” 108 and each such user-plane CU entity 110 may also be “vCU-UP” 110. The vCU-CP 108 and vCU-UP 110 entities may be interconnected through an interface specified by the relevant 3GPP 5G NR Technical Specifications. The vCU-CP 108 and vCU-UP entity 110 may be communicatively coupled with virtual DUs (vDUs) such a vDU 112 and vDU 114 via an interface known to a person skilled in the art. In one non-limiting aspect, each of the virtual DUs 112 and 114 may be hosted a COTS server.

In such an example, the CU-CP 108 and vCU-UP entity 110 may be configured to communicate with a core network 102 of an associated wireless operator using an appropriate backhaul network 104 (typically, a public wide area network such as the Internet). In one non-limiting aspect of the present disclosure, the core network 102 may be a 5G core network in a standalone mode of deployment. The 5G core network may utilize cloud-aligned, service-based architecture that spans across all 5G functions and interactions including authentication, security, session management etc. The 5G core network may further emphasize network function virtualization (NFV) as an integral design concept with virtualized software functions.

In another non-limiting aspect, the core network 102 may be a long-term evolution evolved packet core (LTE EPC) network in a non-standalone mode of deployment where services are provided using previous generation infrastructure (e.g., using existing LTE Evolved Packet Core (EPC)). In non-standalone deployment, an interface S1 may exist between the gNB 101 and the LTE EPC. The present disclosure may also be applicable for standalone and/or non-standalone modes of deployments or other modes of deployments which may be developed in the future.

In one implementation (as shown in FIG. 1), the DU 112 may be serving the UE 120 present in the cells 116*a* and 116*b*, and the DU 114 may be serving the UE 120 present in the cells 118*a* and 118*b*. Each UE 120 may be communicatively coupled to a respective DU 112 and 114, which is serving it via a fronthaul network which may comprise a private network, and/or the Internet, but not limited thereto.

As shown in FIG. 1, the disaggregated architecture of gNB 101 shows that the DU 112 and DU 114 have respective cell coverage defined by cells 116*a*, 116*b* and 118*a*, 118*b*, respectively. The intra gNB-DU mobility may be defined as cell switch of a UE 120 from one cell to another cell of the same DU. The inter gNB-DU mobility may be defined as cell switch of a UE 120 between cells of different gNB DUs.

Figure 2:
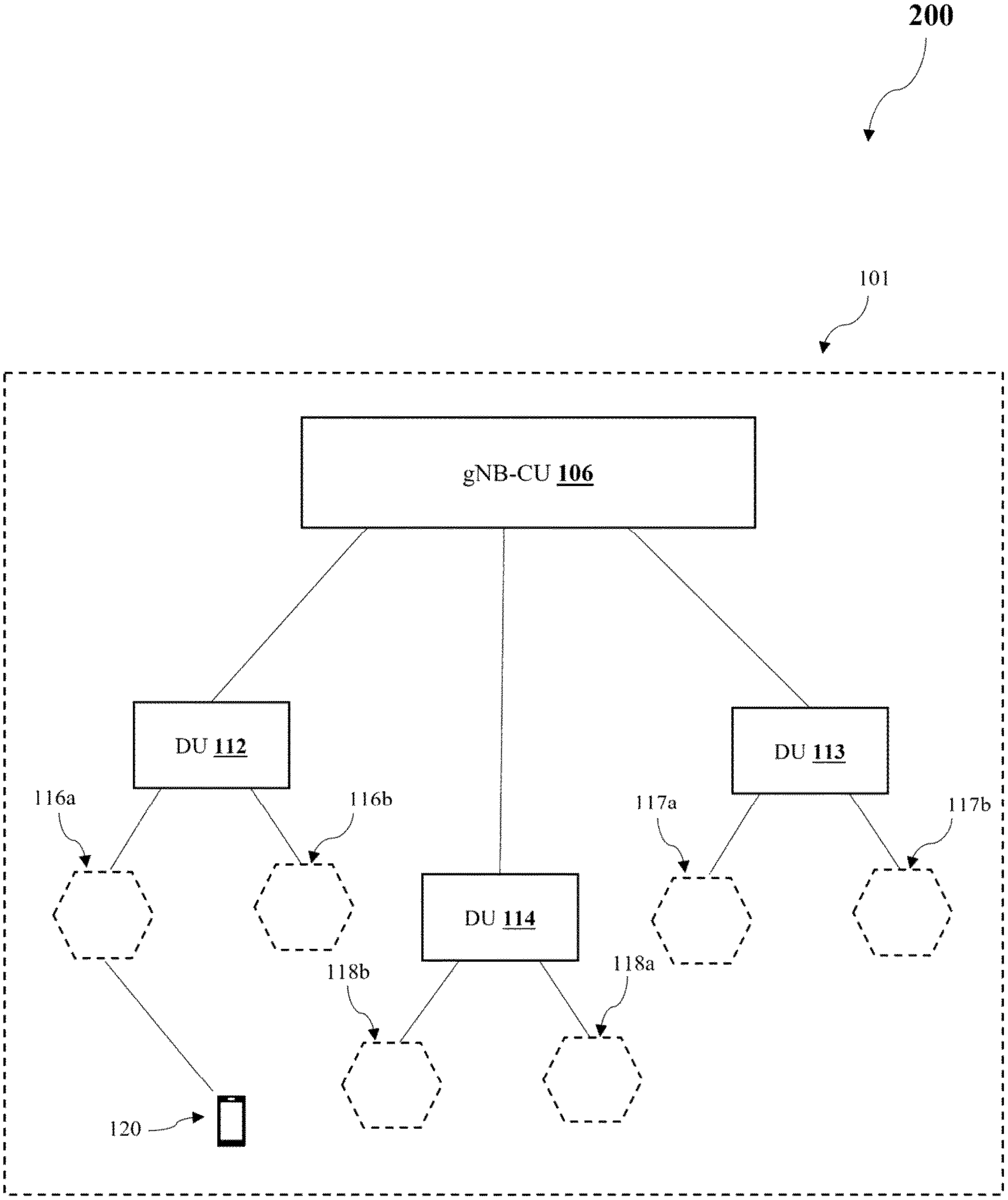
FIG. 2 illustrates a high-level block diagram 200 showing intra gNB-DU mobility, in accordance with some aspects of the present disclosure.

Referring now to FIG. 2 that illustrates a high-level block diagram 200 showing intra gNB-DU mobility, in accordance with some aspects of the present disclosure. The gNB-CU 106 may have DU 112, DU 113, and DU 114 connected to it. Considering the UE 120 is currently served by serving cell 116*a* of the serving DU 112. In an aspect, the serving gNB-CU 106 may configure the UE 120 with multiple LTM candidate cells 116*b*, 117*a*, 117*b*, 118*a*, and 118*b* with RACH configuration for each candidate cell, as configured during the LTM candidate cell preparation. The cells 116*b*, 117*a*, 117*b*, 118*a*, and 118*b* may act as candidate cells, the configuration of which may be defined using RRC configuration message received by the UE 120. The candidate cells 116*b*, 117*a*, 117*b*, 118*a*, and 118*b* may be served by candidate DUs 113 and 114. In one non-limiting aspect, one or more of the candidate cells 116*b*, 117*a*, 117*b*, 118*a*, and 118*b* may be treated as target cell based on radio resource management criteria, as discussed in detail in below aspects.

The UE 120 may be configured to perform L1 measurement and provide the L1 measurement reports (MR) to the serving DU 112. The serving DU 112 may check the set radio resource management (RRM) criteria to decide the possible target cells out of the plurality of candidate cells 116*b*, 117*a*, 117*b*, 118*a*, and 118*b*. The RRM criteria may comprise a measured Reference Signal Received Power (RSRP) threshold and a measured Reference Signal Received Quality (RSRQ) threshold. The serving DU 112 may receive the measured RSRP value and measured RSRQ value of the LTM candidate cells 116*b*, 117*a*, 117*b*, 118*a*, and 118*b* in the L1 measurement report. The serving DU 112 may compare the measured RSRP value and measured RSRQ value of the LTM candidate cells 116*b*, 117*a*, 117*b*, 118*a*, and 118*b* with the RSRP threshold and the RSRQ threshold to determine whether the UE 120 sees the one or more LTM candidate cells as a possible LTM target cell.

If at least one of the measured RSRP value and/or measured RSRQ value of the one or more LTM candidate cells increases the RSRP threshold and the RSRQ threshold, then the corresponding one or more LTM candidate cells are selected as the possible LTM target cells. In an example aspect, the LTM candidate cells 117*a* and the candidate cell 118*b* satisfies the RRM criteria and have the higher probability of becoming the LTM target cell. In such a scenario, the serving DU 112 may instruct/configure the UE 120 to perform UL sync using PDCCH order with the LTM candidate cell 117*a* of the candidate DU 113 and the LTM candidate cell 118*b* of the candidate DU 114. The UL Sync may be performed by a RACH procedure in which the RACH Preamble is transmitted in the RACH request message to the candidate DUs 113 and 114. The RRM criteria ensures that the L1 MR is not arbitrarily sent by UE to all candidate gNB-DUs.

In accordance with an aspect of the present disclosure, while transmitting the RACH Preamble in the RACH request message, the UE 120 may transmit an indication to send L1 measurement report (e.g., one bit based indication) in the RACH request message to the LTM candidate DUs 113 and 114. The one bit based indication may indicate the candidate DUs 113 and 114 that the UE 120 has an L1 measurement report (LTM-specific) to be sent in UL. In one non-limiting aspect, the indication to send L1 measurement report is transmitted as a different message from that of the RACH request message.

The UE 120 may then receive Random Access Response (RAR) message comprising the Timing Advances (TAs) along with the UL scheduling grants of respective candidate cells 117*a* and 118*b* from the candidate DU 113 and the candidate DU 114, respectively. This RAR message may be received directly from the target gNB-DU or via the gNB-CU 106 and the serving gNB-DU 112. In the latter case, the target gNB-DU forwards the RAR as container payload in an F1 message to the gNB-CU. The gNB-CU will then extract the payload and send it to the UE via the serving gNB-DU in an RRC message. The UL scheduling grant may at least comprises a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration. Once, the UE 120 has the TAs and the UL scheduling grants of the candidate cells (possible LTM target cell), the UE 120 may transmit the L1 measurement report (MR) to the LTM candidate gNB-DU 113 and 114.

Since the sending of L1 MR by the UE to the target gNB-DU is tightly coupled with UE performing UL sync, there need not be any limitation on the number of times the UE can be instructed by the serving gNB-DU to send L1 measurement Reports to the target gNB-DU. The L1 MR may be sent whenever a UE is instructed to perform UL sync with the candidate cell. This facilitates avoiding additional signaling required for the acquisition of UL scheduling grants from the candidate cell, thereby reducing signaling overhead and latency. Secondly, since the likelihood of instructing the UE to perform UL sync is when it is closer to performing a LTM cell switch to a given candidate cell (based on RRM criteria), the L1 MR is not arbitrarily sent by UE to all candidate gNB-DUs. The L1 MR is sent only to that target gNB-DU which has a strong likelihood of UE undergoing LTM cell switch. Lastly, since the UL scheduling grant is being sent with the RAR message, which contains the timing advance of the target cell, the UE may have no issue in sending the L1 MR to the target gNB-DU.

The L1 MR received by the target gNB-DU may serve as an indication of an incoming UE (due to an LTM call switch), based on which resource reservation for the UE can be optimized from network point of view at the LTM candidate cell. For example, the receipt of the L1 measurement may trigger initiation of resource reservation which was originally delayed. The L1 MR provides an approximate indication of the UE's mobility towards the target gNB-DU. The L1 MR serves as an indication to re-assign PRACH preambles corresponding to the best beam/beam-group as perceived by the UE. This can also be used to re-configure or modify any other resources already assigned to the UE at the time of target cell preparation. The target cell may also perform serving beam assignment or beam refinement to the UE based on the L1 MR.

Figure 3:
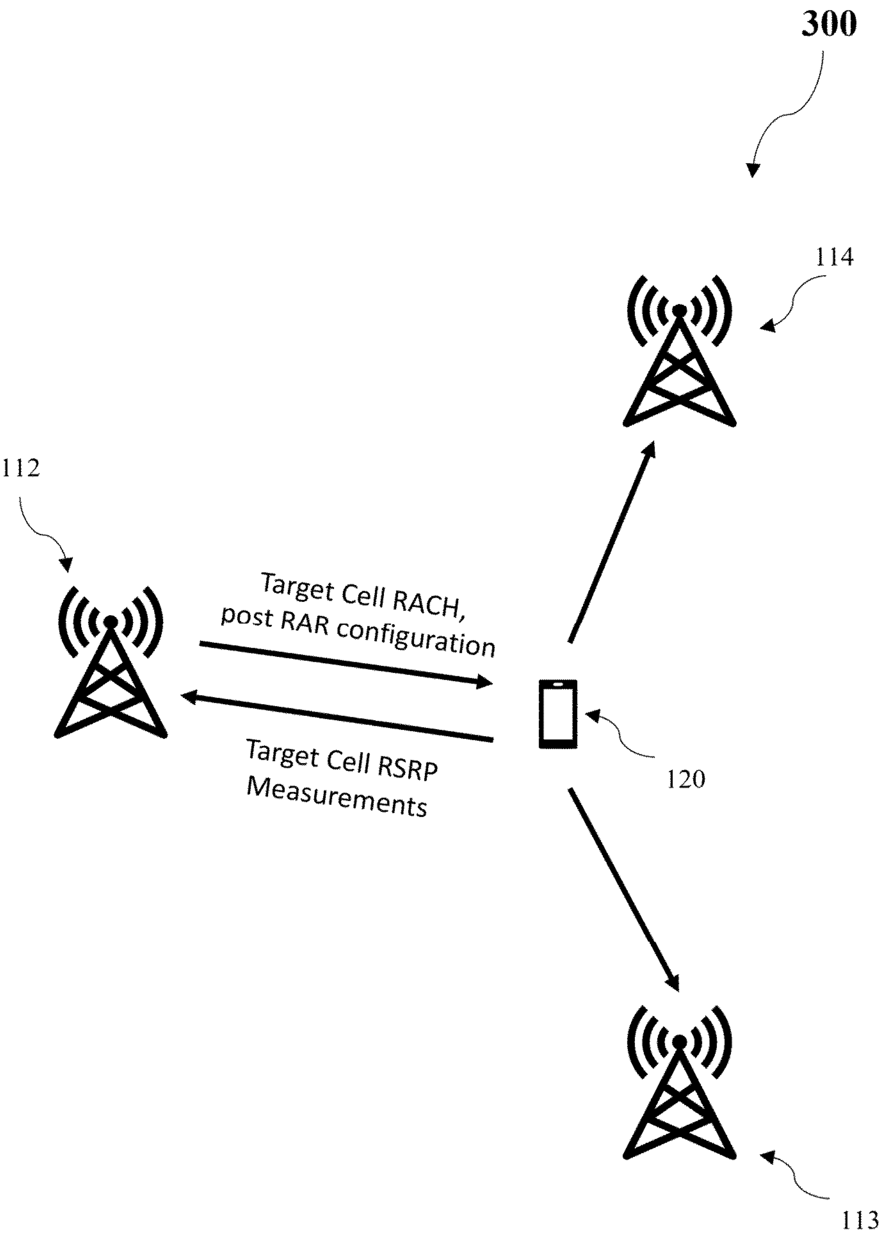
FIG. 3 illustrates a schematic representation 300 of Random Access Resource configuration for a user equipment, in accordance with some aspects of the present disclosure.

Referring to FIG. 3 illustrates a schematic representation 300 of Random Access Resource configuration for a user equipment, in accordance with an aspect of present disclosure. The schematic representation 300 includes a serving cell DU 112, a user equipment (UE) 120, a LTM candidate DU 113, and another LTM candidate DU 114, in accordance with some aspects.

Initially, the gNB-CU 106 of the serving cell DU 112 may request pre-configured grant of the LTM candidate DUs 113 and 114 during inter-gNB-DU LTM candidate cell preparation. The gNB-CU 106 may receive the pre-configured grant for the LTM candidate/target cells of the respective LTM candidate DUs 113 and 114. The UL scheduling grant may at least comprises a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration.

In an aspect, the UE 120 may perform L1 measurement and transmit RSRP/RSRQ measurement of the LTM candidate/target cells to the serving cell DU 112. In response, the serving cell DU 112 may transmit the RACH configuration along with post RAR configuration for each candidate/target cell to the UE 120. The post RAR configuration may comprise pre-configured grant for the LTM candidate/target cells.

In an aspect of the present disclosure, the post RAR configuration may be used by the gNB-CU 106 to configure, the serving gNB-DU 112, the UE 120 with pre-configured grant for each of the LTM target cell so that UE can transmit L1 measurements to target cell(s) served by the DUs 113 and 114. The gNB-CU 106 may also configure, the serving gNB-DU 112, UE 120 with event triggering criteria (similar to RRM criteria of above aspects) for using the pre-configured grant of the target cell to send the L1 MR to the LTM target cell DU. In one non-limiting aspect, the event triggering criteria may be reception of RAR message (and hence target cell TA) which is received after performing the UL sync procedure.

In case an event is triggered according to above mentioned event triggering criteria, the UE 120 may use pre-configured grant for sending L1 MR to the LTM candidate DUs 113 and 114. However, the pre-configured grant is applicable to be used in a given cell only once and if the UE is expected to send L1 MR again, the grants have to be configured again as well.

The L1 MR received by the LTM candidate DUs may be used for RRM purposes. For example, the L1 MR may serve as an indication of an incoming UE (due to an LTM call switch), based on which resource reservation for the UE can be optimized from network point of view at the LTM candidate cell. The receipt of the L1 measurement may trigger initiation of resource reservation which was originally delayed. The L1 MR provides an approximate indication of the UE's mobility towards the LTM candidate DU. The L1 MR also serves as an indication to re-assign PRACH preambles corresponding to the best beam/beam-group as perceived by the UE. This can also be used to re-configure or modify any other resources already assigned to the UE at the time of target cell preparation. The target cell may also perform serving beam assignment or beam refinement to the UE based on the L1 MR.

Figure 4A:
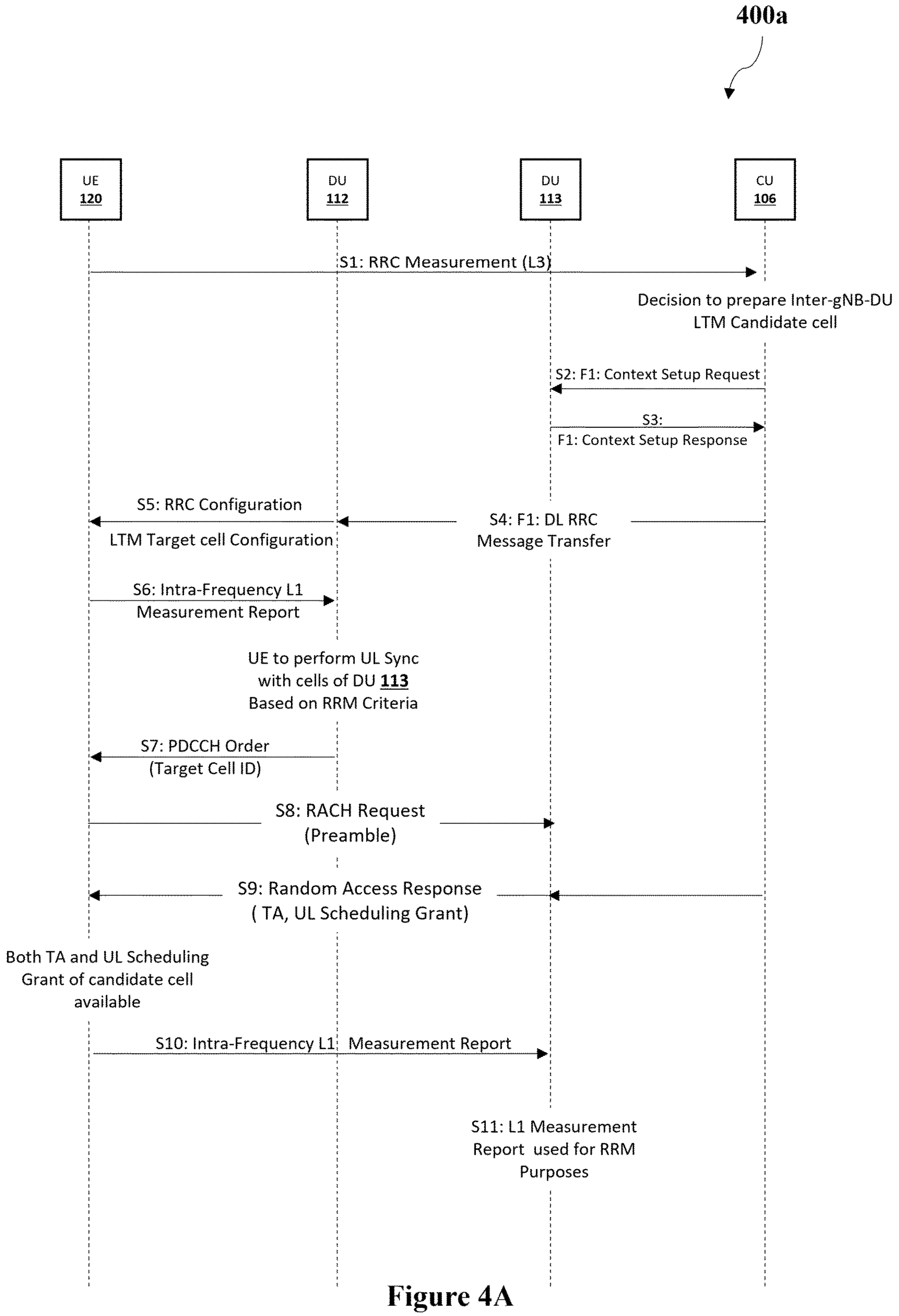
FIG. 4A shows a signaling diagram 400*a* for delivery of L1 measurement to candidate/target gNB-DU during LTM, in accordance with some aspects of the present disclosure.

Referring to FIG. 4 illustrates a schematic representation 400*a* of Random Access Resource configuration for a user equipment, in accordance with an aspect of present disclosure. The schematic representation 300 includes a user equipment (UE) 120, a serving gNB-DU 112, a serving gNB-CU 106, and a candidate gNB-DU 113.

Initially, the UE 120 may perform Layer-3 (L3) RRC measurement and transmits the RRC measurement report to gNB-CU 106 (as shown by step S1). The gNB-CU 106 may process the RRC measurement report and may decide to use Layer (L1/L2) Triggered Mobility (LTM). The gNB-CU 106 may prepare inter-gNB-DU LTM candidate cells based on the RRC measurement report received from the UE 120.

In response, the gNB-CU 106 may initiate the LTM candidate cell preparation by transmitting a F1: context setup request to the candidate gNB-DU 113 serving the candidate cell that is selected as LTM candidate cell (as shown by step S2).

Upon receiving the F1: context setup request the candidate, the gNB-DU 113 may then transmit the context setup response comprising the CellGroupConfig to the gNB-CU 106 (as shown by step S3). In an exemplary aspect, the CellGroupConfig may at least comprise the target cell configuration prepared by the candidate gNB-DU 113. However, the information CellGroupConfig is not limited to above example and may comprise any other information associated with cells of the candidate gNB-DU 113.

It is to be noted that the number of candidate gNB-DUs i.e., candidate gNB-DU 113 is exemplary and may vary based on the L3 RRC measurement carried out by the UE 120.

Moving on, the gNB-CU 106 may carry out F1: downlink (DL) RRC Message Transfer comprising the RRC Reconfiguration to the serving gNB-DU 112 (as shown by step S4). In an aspect, the RRC Reconfiguration may include the LTM target cell configuration. Further, it is to be noted that the process disclosed in the steps S2-S4 (in foregoing paragraphs) may be performed through F1 interface that supports exchange of signaling and information between the gNB-DU and the gNB-CU As a next step, the serving gNB-DU 112 may forward the RRC Reconfiguration message that includes the LTM target cell configuration to the UE 120 (as shown by step S5). Those skilled in the art will appreciate that the RRC Reconfiguration message that includes the LTM target cell configuration may be used by the UE 120, while performing uplink sync with the candidate gNB-DUs and also after the LTM serving cell switch.

The UE 120 may be configured to perform intra-frequency L1 measurement for at least one LTM candidate cell and transmit the L1 measurement report of the LTM candidate cell to the serving gNB-DU 112 (as shown by step S6). In one non-limiting aspect, the UE 120 may be configured to perform inter-frequency L1 measurement for at least one LTM candidate cell, instead of intra-frequency L1 measurement. The UE 120 may be configured to determine one of the RRM criteria is satisfied i.e. measured Reference Signal Received Power (RSRP) of the candidate cell is greater than a predetermined RSRP threshold or the measured Reference Signal Received Quality (RSRQ) of the candidate cell is greater than a predetermined RSRQ threshold.

If the RRM criteria is satisfied, the serving gNB-DU 112 may transmit the Physical Downlink Control Channel (PDCCH) order to the UE 120 (as shown by step S7). The PDCCH order may be used to instruct the UE 120 to perform uplink synchronization with the candidate cells of the candidate gNB-DU 113. The PDCCH order comprises PCIs of the candidate cells that are being served by the candidate gNB-DU 113.

The UE 120 may then perform the UL Sync with the candidate gNB-DUs 113 by transmitting RACH Preamble in the RACH Request message to the candidate gNB-DUs 113 (as shown by step S8). In an aspect, the RACH Request message may comprise at least one bit indicating an availability of L1 measurement report to be sent in UL. This at least one bit information is transmitted in the RACH preamble that is used by the UE 120 to obtain timing advance (TA) associated with candidate cell. In another aspect, the indication to send L1 measurement report is transmitted in a separate message than the RACH Request message.

In response to receiving the RACH Request message with at least one bit information indication, the candidate gNB-DU 113 may configure the Random Access Response (RAR) with the corresponding TA of the candidate cell, UL scheduling grant, and cell ID of the candidate cell. The candidate gNB-DU 113 may transmit the RAR including the TA along with UL scheduling grant of the candidate cell (as shown by step S9).

This RAR and the UL scheduling grant may be sent directly from the target gNB-DU to the UE or via the gNB-CU 106 and the serving gNB-DU 112. In the latter case, the target gNB-DU forwards the RAR as container payload in an F1 message to the gNB-CU. The gNB-CU will then extract the payload and send it to the UE via the serving gNB-DU in an RRC message. The TA for the candidate cell may be valid for a timing advance alignment timer after which the TA expires at the UE 120. In an essential aspect, the UL scheduling grant is transmitted in the RAR message for the UE 120 to send L1 measurement report to the LTM candidate gNB-DU.

Upon receiving the TA of the candidate cell, the UE 120 may store the TAs and UL scheduling grant of the candidate cells along with their corresponding PCIs. The UE 120 may transmit the intra/inter-frequency Layer-1 measurement report (L1 MR) to the LTM candidate gNB-DU 113, in response to receipt of the UL scheduling grant in the RAR message (as shown by step S10).

Since the sending of L1 MR by the UE 120 to the candidate gNB-DU 113 is tightly coupled with UE 120 performing UL sync, there need not be any limitation on the number of times the UE 120 can be instructed by the serving gNB-DU 112 to send L1 measurement Reports to the candidate gNB-DU 113. The L1 MR may be sent whenever a UE is instructed to perform UL sync with the candidate cell. This facilitates avoiding additional signaling required for the acquisition of UL scheduling grants from the candidate cell, thereby reducing signaling overhead and latency. Secondly, since the likelihood of instructing the UE to perform UL sync is when it is closer to performing a LTM cell switch to a given candidate cell (based on RRM criteria), the L1 MR is not arbitrarily sent by UE to all candidate gNB-DUs. The L1 MR is sent only to that candidate gNB-DU which has a strong likelihood of UE undergoing LTM cell switch. Lastly, since the UL scheduling grant is being sent in the RAR message, which contains the timing advance of the target cell, the UE may have no issue in sending the L1 MR to the target gNB-DU.

The L1 MR received by the candidate gNB-DU may be used for RRM purposes (as shown by step S11). For example, the L1 MR may serve as an indication of an incoming UE (due to an LTM call switch), based on which resource reservation for the UE can be optimized from network point of view at the LTM candidate cell. The receipt of the L1 measurement may trigger initiation of resource reservation which was originally delayed. The L1 MR provides an approximate indication of the UE's mobility towards the target gNB-DU. The L1 MR also serves as an indication to re-assign PRACH preambles corresponding to the best beam/beam-group as perceived by the UE. This can also be used to re-configure or modify any other resources already assigned to the UE at the time of target cell preparation. The target cell may also perform serving beam assignment or beam refinement to the UE based on the L1 MR.

Figure 4B:
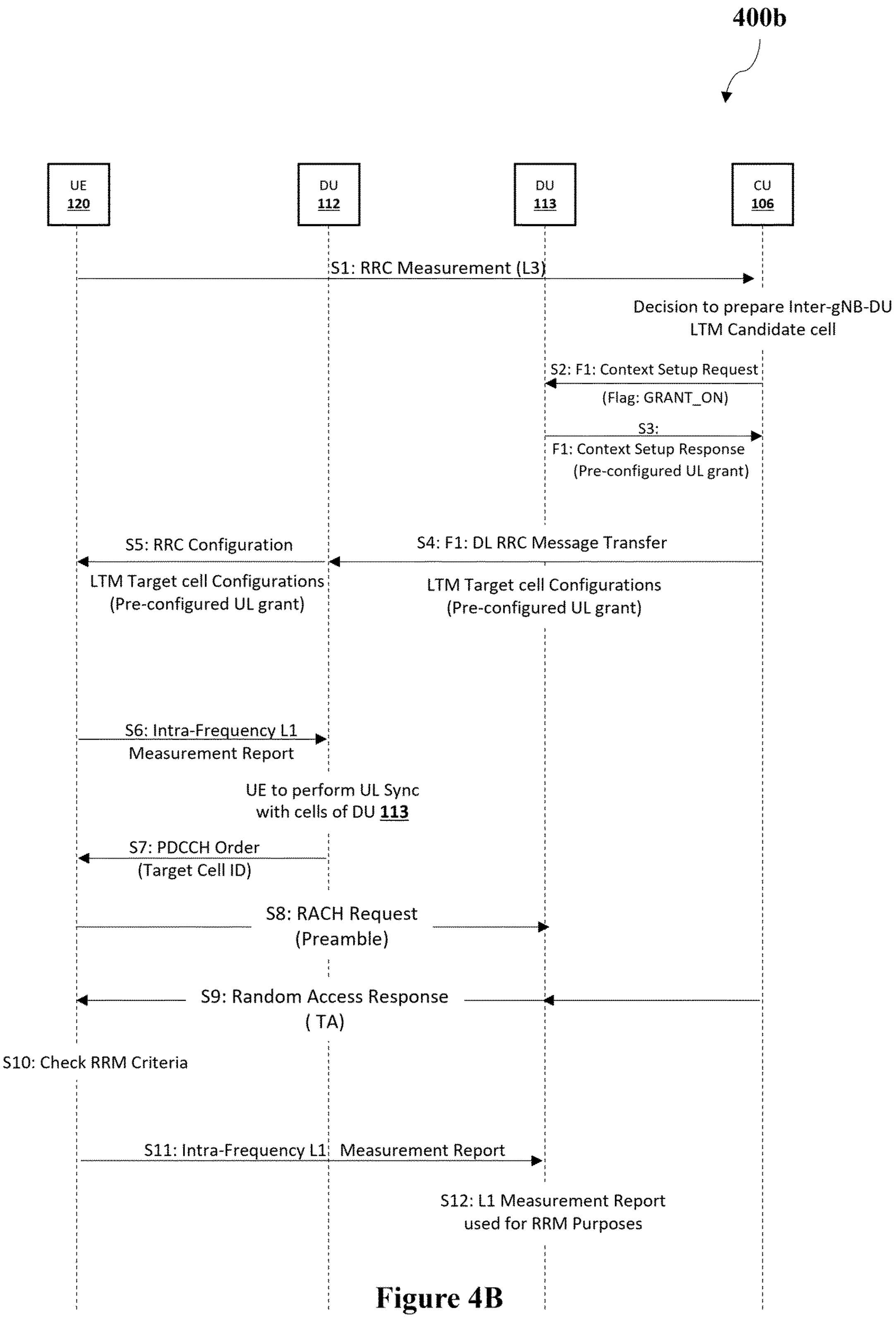
FIG. 4B shows a signaling diagram 400*b* for delivery of L1 measurement to candidate/target gNB-DU during LTM, in accordance with some aspects of the present disclosure.

Referring to FIG. 4B that discloses a signaling diagram 400*b* of Random Access Resource configuration for a user equipment, in accordance with an aspect of present disclosure. The signaling diagram 300*a* includes a user equipment (UE) 120, a serving gNB-DU 112, a gNB-CU 106, and a candidate gNB-DU 113.

Initially, the UE 120 may perform Layer-3 (L3) RRC measurement and transmits the RRC measurement report to gNB-CU 106 (as shown by step S1). The gNB-CU 106 may process the RRC measurement report and may decide to use Layer (L1/L2) Triggered Mobility (LTM). The gNB-CU 106 may prepare inter-gNB-DU LTM candidate cells based on the RRC measurement report received from the UE 120.

In response, the gNB-CU 106 may initiate the LTM candidate cell preparation by transmitting a F1: context setup request to the candidate gNB-DU 113 serving the candidate cell that is selected as LTM candidate cell (as shown by step S2). The context setup request may comprise a flag (Grant ON) requesting pre-configured UL grant from the candidate gNB-DU 113 for its candidate cell.

Upon receiving the F1: context setup request the candidate, the gNB-DU 113 may then transmit the context setup response comprising the pre-configured UL grant to the gNB-CU 106 (as shown by step S3). The context setup response may also comprise CellGroupConfig for the candidate cell preparation.

It is to be noted that the number of candidate gNB-DUs i.e., candidate gNB-DU 113 is exemplary and may vary based on the L3 RRC measurement carried out by the UE 120.

Moving on, the gNB-CU 106 may carry out F1: downlink (DL) RRC Message Transfer comprising the pre-configured UL grant and the RRC Reconfiguration to the serving gNB-DU 112 (as shown by step S4). In an aspect, the RRC Reconfiguration may include the pre-configured UL grant and the LTM target cell configuration. Further, it is to be noted that the process disclosed in the steps S2-S4 (in foregoing paragraphs) may be performed through F1 interface that supports exchange of signaling and information between the gNB-DU and the gNB-CU.

As a next step, the serving gNB-DU 112 may forward the RRC Reconfiguration message that includes the pre-configured UL grant to the UE 120 (as shown by step S5). The pre-configured UL grant may be used by the serving gNB-DU 112 to configure the UE 120 with pre-configured grant for each of the LTM target/candidate cells so that UE can transmit L1 measurements to target cell(s) served by the candidate DU 113. The serving gNB-DU 112 may also configure UE 120 with event triggering criteria (similar to RRM criteria). The event triggering criteria may include determining whether measured Reference Signal Received Power (RSRP) of the candidate cell is greater than a predetermined RSRP threshold or the measured Reference Signal Received Quality (RSRQ) of the candidate cell is greater than a predetermined RSRQ threshold. The event triggering criteria may trigger the UE 120 to use the pre-configured grant of the candidate cell to send the L1 MR to the candidate DU 113. In one non-limiting aspect, the event triggering criteria may be reception of RAR message (i.e. reception of target cell TA) which is received after performing the UL sync procedure.

The UE 120 may be configured to perform intra-frequency L1 measurement for at least one LTM candidate cell and transmit the L1 measurement report of the LTM candidate cell to the serving gNB-DU 112 (as shown by step S6). In one non-limiting aspect, the UE 120 may be configured to perform inter-frequency L1 measurement for at least one LTM candidate cell, instead of intra-frequency L1 measurement.

The serving gNB-DU 112 may transmit the Physical Downlink Control Channel (PDCCH) order to the UE 120 (as shown by step S7). The PDCCH order may be used to instruct the UE 120 to perform uplink synchronization with the candidate cells of the candidate gNB-DU 113. The PDCCH order comprises PCIs of the candidate cells that are being served by the candidate gNB-DU 113.

The UE 120 may then perform the UL Sync with the candidate gNB-DUs 113 by transmitting RACH Preamble in the RACH Request message to the candidate gNB-DUs 113 (as shown by step S8).

In response to receiving the RACH Request message, the candidate gNB-DU 113 may configure the Random Access Response (RAR) with the corresponding TA of the candidate cell and cell ID of the candidate cell. The candidate gNB-DU 113 may transmit the RAR including the TA and the UL scheduling grant of the candidate cell (as shown by step S9).

This RAR may be sent directly from the target gNB-DU to the UE or via the gNB-CU 106 and the serving gNB-DU 112. In the latter case, the target gNB-DU forwards the RAR as container payload in an F1 message to the gNB-CU. The gNB-CU will then extract the payload and send it to the UE via the serving gNB-DU in an RRC message. The TA for the candidate cell may be valid for a timing advance alignment timer after which the TA expires at the UE 120.

Upon receiving the TA of the candidate cell, the UE 120 may determine whether the above mentioned event trigger criteria is satisfied (as shown by step S10). If the event is triggered, the UE 120 may transmit the intra/inter-frequency Layer-1 measurement report (L1 MR) to the LTM candidate gNB-DU 113 (as shown by step S11).

The L1 MR received by the candidate gNB-DU may be used for RRM purposes (as shown by step S12). For example, the L1 MR may serve as an indication of an incoming UE (due to an LTM call switch), based on which resource reservation for the UE can be optimized from network point of view at the LTM candidate cell. The receipt of the L1 measurement may trigger initiation of resource reservation which was originally delayed. The L1 MR provides an approximate indication of the UE's mobility towards the target gNB-DU. The L1 MR also serves as an indication to re-assign PRACH preambles corresponding to the best beam/beam-group as perceived by the UE. This can also be used to re-configure or modify any other resources already assigned to the UE at the time of target cell preparation. The target cell may also perform serving beam assignment or beam refinement to the UE based on the L1 MR.

Figure 5:
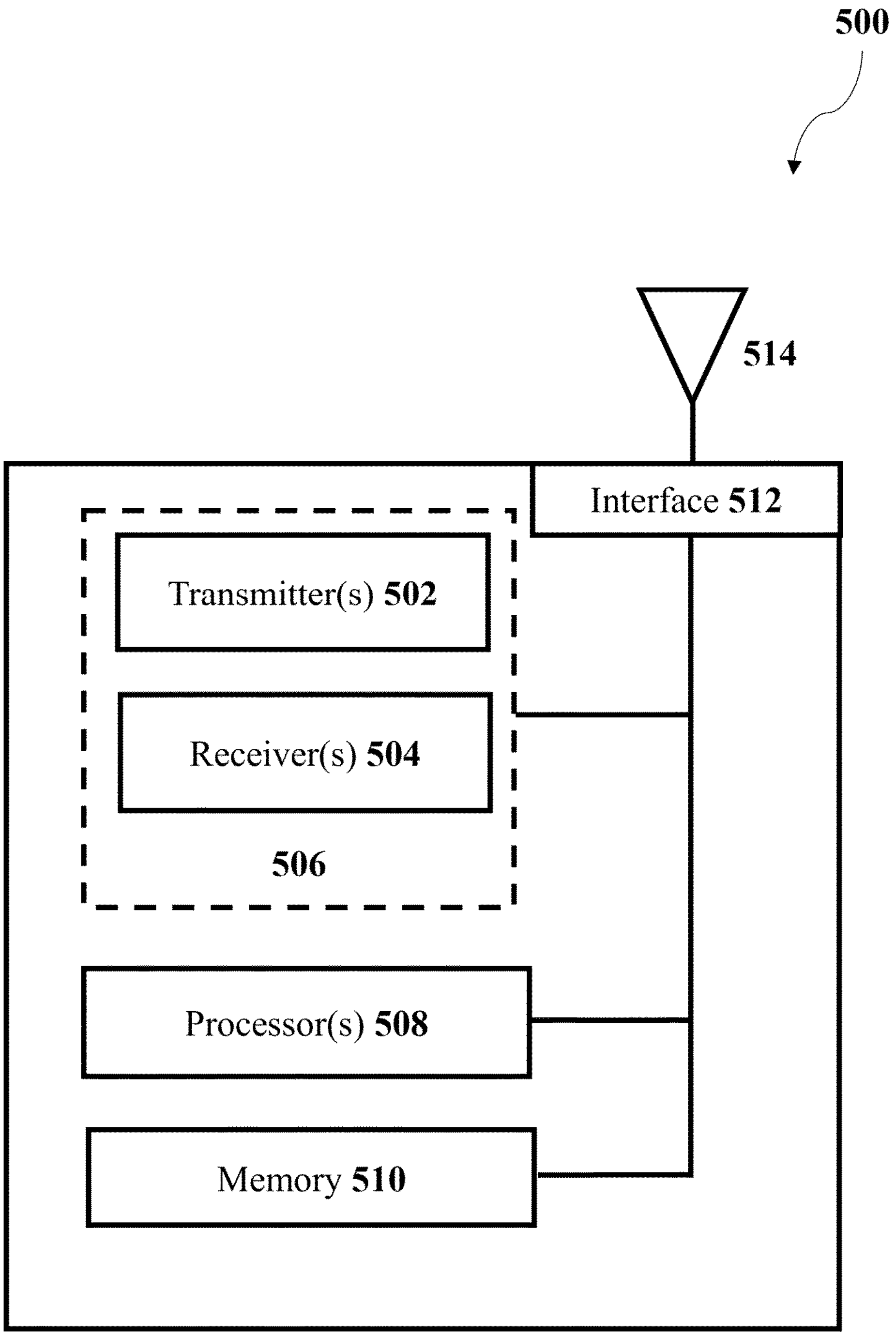
FIG. 5 shows a high-level block diagram of an apparatus 500 for delivery of L1 measurement to candidate/target gNB-DU during LTM, in accordance with some aspects of the present disclosure.

Referring now to FIG. 5 which illustrates a block diagram of an apparatus 500 for delivery of L1 measurement to candidate/target gNB-DU during LTM, in accordance with some aspects of the present disclosure. The apparatus 500 may comprise at least one transmitter 502, at least one receiver 504, at least one processor 508, memory 510, at least one interface 512, and at least one antenna 514. The at least one transmitter 502 may be configured to transmit data/information to one or more entities using the antenna 514 and the at least one receiver 504 may be configured to receive data/information from the one or more nodes/devices using the antenna 514. The at least one transmitter and receiver may be collectively implemented as a single transceiver module 506. In one non-limiting aspect, the at least one processor 508 may be communicatively coupled with the transceiver 506, memory 510, interface 512, and antenna 514 for delivery of L1 measurement to candidate/target gNB-DU during LTM.

The at least one processor 508 may include, but not restricted to, microprocessors, microcomputers, micro-controllers, central processing units, state machines, logic circuitries, and/or any devices that manipulate signals based on operational instructions. A processor may also be implemented as a combination of computing devices, e.g., a combination of a plurality of microprocessors or any other such configuration. The memory 510 may be communicatively coupled to the at least one processor 508 and may comprise various instructions for delivery of L1 measurement to candidate/target gNB-DU during LTM. The memory 510 may include a Random-Access Memory (RAM) unit and/or a nonvolatile memory unit such as a Read Only Memory (ROM), optical disc drive, magnetic disc drive, flash memory, Electrically Erasable Read Only Memory (EEPROM), a memory space on a server or cloud and so forth. The at least one processor 508 may be configured to execute one or more instructions stored in the memory 510.

The interfaces 512 may include a variety of software and hardware interfaces, for example, a web interface, a graphical user interface, an input device-output device (I/O) interface, a network interface and the like. The I/O interfaces may allow the apparatus 500 to communicate with one or more nodes/devices either directly or through other devices. The network interface may allow the apparatus 500 to interact with one or more networks either directly or via any other network.

In one non-limiting aspect, the apparatus 500 may be a part of the UE 120 but not limited thereto.

The at least one processor 508 may be configured to perform intra-frequency L1 measurement for at least one LTM candidate cell periodically or after a predetermined time duration. In another aspect, the at least one processor 508 may be configured to perform inter-frequency L1 measurement for at least one LTM candidate cell. The at least one processor 508 may be configured to transmit the L1 measurement report of the at least one LTM candidate cell to the serving gNB-DU. The L1 measurement report may be used by the serving gNB-DU to determine whether the RRM criteria is satisfied, as discussed in above aspects.

The at least one processor 508 may be configured to perform intra/inter-frequency L1 measurement for at least one candidate cell periodically or after a predetermined time duration. The at least one processor 508 may be then configured to transmit intra/inter-frequency L1 measurement report of the at least one candidate cell to the serving gNB-DU. The intra/inter-frequency L1 measurement report may be used by the serving gNB-DU to determine whether the RRM criteria is satisfied. For which, the serving gNB-DU may determine whether the measured Reference Signal Received Power (RSRP) of the at least one LTM candidate cell is greater than a predetermined RSRP threshold and whether the measured Reference Signal Received Quality (RSRQ) of the at least one LTM candidate cell is greater than a predetermined RSRQ threshold. If the above mentioned conditions are satisfied, the serving gNB-DU may transmit a Physical Downlink Control Channel (PDCCH) order to perform uplink synchronization with at least one LTM candidate cell of at least one candidate gNB-DU.

The at least one processor 508 may be configured to receive the PDCCH order to perform uplink synchronization with the at least one LTM candidate cell of at least one candidate gNB-DU. The PDCCH order is received from serving gNB-DU. The at least one processor 508 may be configured to transmit Random Access Channel (RACH) Request message, to the at least one LTM candidate gNB-DU serving the at least one LTM candidate cell. The RACH request may comprise an indication to send L1 measurement report along with RACH preamble. In one non-limiting aspect, the RACH Request message may comprise at least one bit indicating an availability of L1 measurement report to be sent in UL. In another non-limiting aspect, the indication to send L1 measurement report may be provided in a separate message, which is different from the RACH Request message.

The at least one processor 508 may be then configured to receive, a Random Access Response (RAR) message and an uplink (UL) scheduling grant, either directly from the at least one LTM candidate gNB-DU or via the serving gNB-DU. The RAR response message and UL scheduling grant of the at least one LTM candidate cell, which is required to send L1 measurement report to the at least one LTM candidate gNB-DU. The UL scheduling grant may at least comprise a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration. In one non-limiting aspect, the RAR response message may also comprise TA and Time alignment timer (TAT) of the at least one LTM candidate cell served by the at least one LTM candidate gNB-DU.

The at least one processor 508 may be then configured to transmit the L1 measurement report of the at least one LTM candidate cell to the serving gNB-DU. In one non-limiting aspect, to transmit the L1 measurement report indication along with RACH preamble to the at least one LTM candidate gNB-DU, the at least one processor 508 may be configured to transmit the L1 measurement report indication along with the RACH preamble in the RACH Request message to the at least one LTM candidate gNB-DU if the L1 measurement report indicates at least one of the measured Reference Signal Received Power (RSRP) of the at least one LTM candidate cell is greater than the predetermined RSRP threshold and the measured Reference Signal Received Quality (RSRQ) of the at least one LTM candidate cell is greater than a predetermined RSRQ threshold. However, this step may be optional, as this step may be performed at the serving gNB-DU to decide the LTM candidate cell for initiation of RACH procedure.

Since the transmission of the of L1 MR by the UE to the candidate gNB-DU is tightly coupled with UE performing UL sync, there need not be any limitation on the number of times the UE can be instructed by the serving gNB-DU to send L1 measurement Reports to the candidate gNB-DU. The L1 MR may be sent whenever a UE is instructed to perform UL sync with the candidate cell. Thus, the apparatus 500 facilitates avoiding additional signaling required for the acquisition of UL scheduling grants from the candidate cell, thereby reducing signaling overhead and latency. Secondly, since the likelihood of instructing the UE to perform UL sync is when it is closer to performing a LTM cell switch to a given candidate cell (based on RRM criteria), the apparatus 500 ensures that the L1 MR is not arbitrarily sent by UE to all candidate gNB-DUs and the L1 MR is sent only to that candidate gNB-DU which has a strong likelihood of UE undergoing LTM cell switch. Lastly, since the UL scheduling grant is being sent in the RAR message, which contains the timing advance of the LTM candidate cell, the apparatus 500 may have no issue in sending the L1 MR to the LTM candidate gNB-DU.

The L1 MR received by the LTM candidate gNB-DU may be used for RRM purposes. For example, the L1 MR may serve as an indication of an incoming UE (due to an LTM call switch), based on which resource reservation for the UE can be optimized from network point of view at the LTM candidate cell. The receipt of the L1 measurement may trigger initiation of resource reservation which was originally delayed. The L1 MR provides an approximate indication of the UE's mobility towards the LTM candidate gNB-DU. The L1 MR also serves as an indication to re-assign PRACH preambles corresponding to the best beam/beam-group as perceived by the UE. This can also be used to re-configure or modify any other resources already assigned to the UE at the time of LTM candidate cell preparation. The target cell may also perform serving beam assignment or beam refinement to the UE based on the L1 MR.

Figure 6:
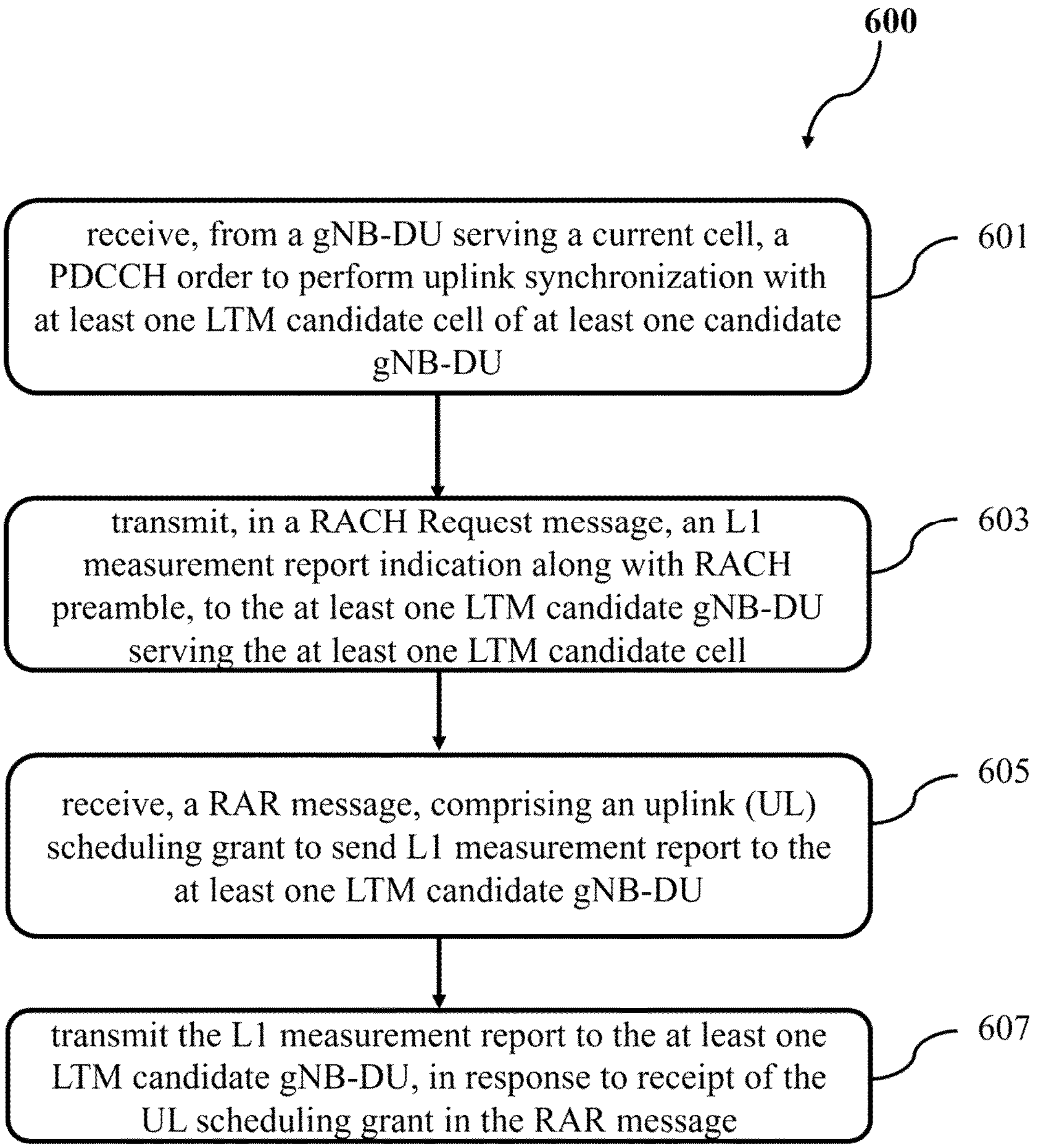
FIG. 6 shows a flowchart of an exemplary method 600 for delivery of L1 measurement to candidate/target gNB-DU during LTM, in accordance with some aspects of the present disclosure.

Referring now to FIG. 6, a flowchart is described illustrating an exemplary method 600 for delivery of L1 measurement to candidate/target gNB-DU during LTM, in accordance with some aspects of the present disclosure. The method 600 is merely provided for exemplary purposes, and aspects are intended to include or otherwise cover timing advance management procedures. In one non-limiting aspect, the method 600 may be performed at the UE.

The method 600 may include, at block 601, receiving a Physical Downlink Control Channel (PDCCH) order to perform uplink synchronization with at least one LTM candidate cell of at least one candidate gNB-DU. The PDCCH order is received from serving gNB-DU serving a UE in a current serving cell.

In an aspect, for receiving the PDCCH order to perform uplink synchronization with the at least one LTM candidate cell of the at least one candidate gNB-DU, the method 600 may further comprise to performing intra/inter-frequency L1 measurement for at least one LTM candidate cell periodically or after a predetermined time duration and transmitting the L1 measurement report of the at least one LTM candidate cell to the serving gNB-DU.

The intra/inter-frequency L1 measurement report may be used by the serving gNB-DU to determine whether the RRM criteria is satisfied. For which, the serving gNB-DU may determine whether the measured Reference Signal Received Power (RSRP) of the at least one LTM candidate cell is greater than a predetermined RSRP threshold and whether the measured Reference Signal Received Quality (RSRQ) of the at least one LTM candidate cell is greater than a predetermined RSRQ threshold. If the above mentioned conditions are satisfied, the serving gNB-DU may transmit a Physical Downlink Control Channel (PDCCH) order to perform uplink synchronization with at least one LTM candidate cell of at least one candidate gNB-DU.

The method 600 may include, at block 603, transmitting, in a Random Access Channel (RACH) Request message, an indication to send the L1 measurement report along with RACH preamble, to the at least one LTM candidate gNB-DU serving the at least one LTM candidate cell. In one non-limiting aspect, the RACH Request message may comprise at least one bit indicating an availability of L1 measurement report to be sent in UL. In another non-limiting aspect, the indication to send the L1 measurement report may be transmitted a separate message different from that of the RACH request message.

The method 600 may include, at block 605, receiving, a Random Access Response (RAR) message and an uplink (UL) scheduling grant of the at least one LTM candidate cell, either directly from the at least one LTM candidate gNB-DU or via the serving gNB-DU. The RAR response message and the UL scheduling grant of the at least one LTM candidate cell, which is required to send L1 measurement report to the at least one LTM candidate gNB-DU. The UL scheduling grant may at least comprise a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS)

configuration, and UL-precoder configuration. In one non-limiting aspect, the RAR response message may also comprise TA and Time alignment timer (TAT) of the at least one LTM candidate cell served by the at least one LTM candidate gNB-DU.

The method 600 may include, at block 607, transmitting the L1 measurement report of the at least one LTM candidate cell to the serving gNB-DU. In one non-limiting aspect, for transmitting the L1 measurement report indication along with RACH preamble to the at least one LTM candidate gNB-DU, the method 600 may comprise transmitting the L1 measurement report indication along with the RACH preamble in the RACH Request message to the at least one LTM candidate gNB-DU if the L1 measurement report indicates that the at least one of the measured Reference Signal Received Power (RSRP) of the at least one LTM candidate cell is greater than the predetermined RSRP threshold and/or the Reference Signal Received Quality (RSRQ) of the at least one LTM candidate cell is greater than a predetermined RSRQ threshold. However, this step may be optional, as this step may be performed at the serving gNB-DU to decide the LTM candidate cell for initiation of RACH procedure.

Since the transmission of the of L1 MR by the UE to the candidate gNB-DU is tightly coupled with UE performing UL sync, there need not be any limitation on the number of times the UE can be instructed by the serving gNB-DU to send L1 measurement Reports to the candidate gNB-DU. The L1 MR may be sent whenever a UE is instructed to perform UL sync with the candidate cell. Thus, the method 600 facilitates avoiding additional signaling required for the acquisition of UL scheduling grants from the candidate cell, thereby reducing signaling overhead and latency. Secondly, since the likelihood of instructing the UE to perform UL sync is when it is closer to performing a LTM cell switch to a given candidate cell (based on RRM criteria), the method 600 ensures that the L1 MR is not arbitrarily sent by UE to all candidate gNB-DUs and the L1 MR is sent only to that candidate gNB-DU which has a strong likelihood of UE undergoing LTM cell switch. Lastly, since the UL scheduling grant is being sent in the RAR message, which contains the timing advance of the LTM candidate cell, the UE may have no issue in sending the L1 MR to the LTM candidate gNB-DU.

The L1 MR received by the LTM candidate gNB-DU may be used for RRM purposes. For example, the L1 MR may serve as an indication of an incoming UE (due to an LTM call switch), based on which resource reservation for the UE can be optimized from network point of view at the LTM candidate cell. The receipt of the L1 measurement may trigger initiation of resource reservation which was originally delayed. The L1 MR provides an approximate indication of the UE's mobility towards the LTM candidate gNB-DU. The L1 MR also serves as an indication to re-assign PRACH preambles corresponding to the best beam/beam-group as perceived by the UE. This can also be used to re-configure or modify any other resources already assigned to the UE at the time of LTM candidate cell preparation. The target cell may also perform serving beam assignment or beam refinement to the UE based on the L1 MR.

Figure 7:
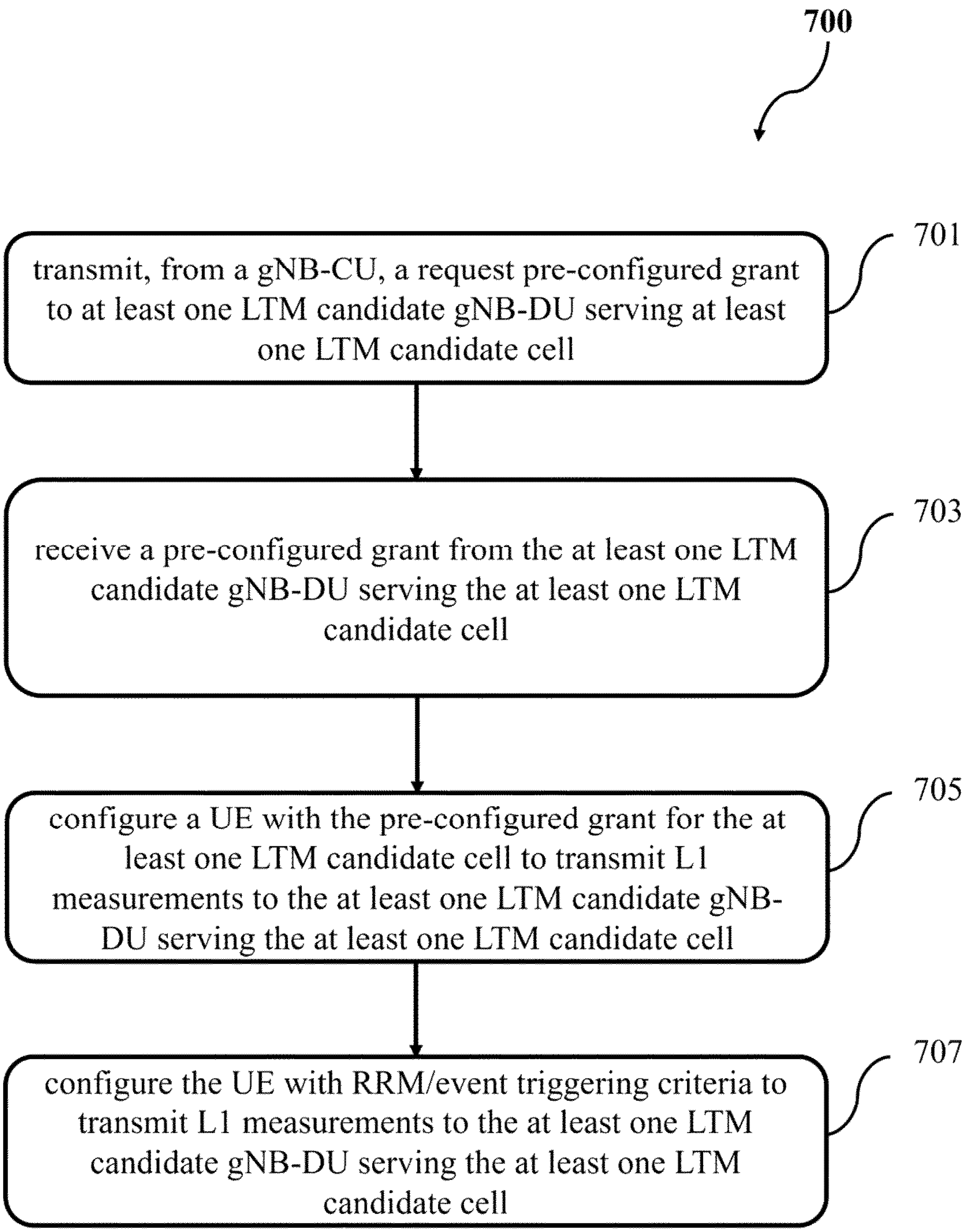
FIG. 7 shows a flowchart of another exemplary method 700 for delivery of L1 measurement to candidate/target gNB-DU during LTM, in accordance with some aspects of the present disclosure.

Referring now to FIG. 7, a flowchart is described illustrating another exemplary method 700 for delivery of L1 measurement to candidate/target gNB-DU during LTM, according to an aspect of the present disclosure. The method 700 is merely provided for exemplary purposes, and aspects are intended to include or otherwise cover any timing advance management methods or procedures. In one non-limiting aspect, the method 700 may be performed at the gNB-CU or gNB-DU.

The method 700 may include, at block 701, transmitting, from a gNB-CU, a request pre-configured grant to at least one LTM candidate gNB-DU serving at least one LTM candidate cell. The request may be transmitted in the F1: context setup request using a flag (Grant ON), as discussed in explanation of FIG. 4B above.

The method 700 may include, at block 703, receiving a pre-configured grant from the at least one LTM candidate gNB-DU serving the at least one LTM candidate cell. The LTM candidate gNB-DU may transmit the context setup response comprising the pre-configured UL grant to the gNB-CU 106, as discussed in explanation of FIG. 4B above.

The method 700 may include, at block 705, configuring a UE with the pre-configured grant for the at least one LTM candidate cell to transmit L1 measurements to the at least one LTM candidate gNB-DU serving the at least one LTM candidate cell.

The method 700 may include, at block 707, configuring the UE with RRM/event triggering criteria to transmit L1 measurements to the at least one LTM candidate gNB-DU serving the at least one LTM candidate cell. The event triggering criteria may include determining whether at least one of measured Reference Signal Received Power (RSRP) of the candidate cell is greater than a predetermined RSRP threshold or the measured Reference Signal Received Quality (RSRQ) of the candidate cell is greater than a predetermined RSRQ threshold. The event triggering criteria may trigger the UE 120 to use the pre-configured grant of the candidate cell to send the L1 MR to the candidate DU 113. In one non-limiting aspect, the event triggering criteria may be reception of RAR message (i.e. reception of target cell TA) which is received after performing the UL sync procedure.

If the event is triggered, the UE may transmit the intra/inter-frequency Layer-1 measurement report (L1 MR) to the LTM candidate gNB-DU, as shown by step S11 and corresponding explanation of FIG. 4B above.

The L1 MR received by the candidate gNB-DU may be used for RRM purposes (as shown by step S12). For example, the L1 MR may serve as an indication of an incoming UE (due to an LTM call switch), based on which resource reservation for the UE can be optimized from network point of view at the LTM candidate cell. The receipt of the L1 measurement may trigger initiation of resource reservation which was originally delayed. The L1 MR provides an approximate indication of the UE's mobility towards the target gNB-DU. The L1 MR also serves as an indication to re-assign PRACH preambles corresponding to the best beam/beam-group as perceived by the UE. This can also be used to re-configure or modify any other resources already assigned to the UE at the time of target cell preparation. The target cell may also perform serving beam assignment or beam refinement to the UE based on the L1 MR.

The above methods 600 and 700 may be described in the general context of computer executable instructions. Generally, computer executable instructions can include routines, programs, objects, components, data structures, procedures, modules, and functions, which perform specific functions or implement specific abstract data types.

The various blocks of the methods 600 and 700 shown in FIGS. 6 and 7 have been arranged in a generally sequential manner for case of explanation. However, it is to be understood that this arrangement is merely exemplary, and it should be recognized that the processing associated with methods 600 and 700 (and the blocks shown in FIGS. 6 and 7) can occur in a different order (for example, where at least some of the processing associated with the blocks is performed in parallel and/or in an event-driven manner). Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module (s). Generally, where there are operations illustrated in Figures, those operations may have corresponding counterpart means-plus-function components.

It may be noted here that the subject matter of some or all aspects described with reference to FIGS. 1, 2, 3, 4A, and 4B may be relevant for the methods and the same is not repeated for the sake of brevity.

In a non-limiting aspect of the present disclosure, one or more non-transitory computer-readable media may be utilized for implementing the aspects consistent with the present disclosure. A computer-readable media refers to any type of physical memory (such as the memory 510) on which information or data readable by a processor may be stored. Thus, a computer-readable media may store one or more instructions for execution by the at least one processor 508, including instructions for causing the at least one processor 508 to perform steps or stages consistent with the aspects described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain non-limiting aspects may comprise a computer program product for performing the operations presented herein. For example, such a computer program product may comprise a computer readable media having instructions stored (and/or encoded) thereon, the instructions being executable by one or more processors to perform the operations described herein. For certain non-limiting aspects, the computer program product may include packaging material.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

A description of an aspect with several components in communication with each other does not imply that all such components are required. On the contrary, a variety of optional components are described to illustrate the wide variety of possible aspects of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the aspects of the present disclosure are intended to be illustrative, but not limiting, of the scope of the disclosure, which is set forth in the appended claims.

The present disclosure may further include the below aspects:

1. An apparatus comprising hardware configured to:
   - receive, from a gNodeB Distributed Unit (gNB-DU) serving a serving a user equipment (UE) in a current serving cell, a Physical Downlink Control Channel (PDCCH) order to perform uplink synchronization with at least one Layer (L1/L2) Triggered Mobility (LTM) candidate cell of at least one candidate gNB-DU;
   - transmit, in a Random Access Channel (RACH) Request message, an indication to send L1 measurement report along with RACH preamble, to the at least one LTM candidate gNB-DU serving the at least one LTM candidate cell;
   - receive, a Random Access Response (RAR) message along with an uplink (UL) scheduling grant, to send L1 measurement report to the at least one LTM candidate gNB-DU, either directly from the at least one LTM candidate gNB-DU or via the serving gNB-DU; and
   - transmit the L1 measurement report to the at least one LTM candidate gNB-DU, in response to receipt of the UL scheduling grant in the RAR message.
2. The apparatus of aspect 1, wherein the hardware is configured to transmit the L1 measurement report to the at least one LTM candidate gNB-DU further based on a pre-configured grant for the at least one LTM candidate cell.
3. The apparatus of aspect 1, wherein to receive the PDCCH order to perform uplink synchronization with the at least one LTM candidate cell of the at least one candidate gNB-DU, the hardware is further configured to:
   - periodically perform, intra and/or inter-frequency L1 measurement for at least one LTM candidate cell; and
   - transmit the L1 measurement report of the at least one LTM candidate cell to the serving gNB-DU.
4. The apparatus of aspect 1, wherein the PDCCH order to perform uplink synchronization with the at least one LTM candidate cell is received from the serving gNB-DU, if the L1 measurement report indicates at least one of:
   - a measured Reference Signal Received Power (RSRP) of the at least one LTM candidate cell is greater than a predetermined RSRP threshold, and
   - a measured Reference Signal Received Quality (RSRQ) of the at least one LTM candidate cell is greater than a predetermined RSRQ threshold.
5. The apparatus of aspect 1, wherein to transmit the L1 measurement report indication along with RACH preamble, to the at least one LTM candidate gNB-DU, the hardware is further configured to:
   - transmit the L1 measurement report indication along with the RACH preamble in the RACH Request message to the at least one LTM candidate gNB-DU,
   - if the L1 measurement report indicates at least one oft:
     - a measured Reference Signal Received Power (RSRP) of the at least one LTM candidate cell is greater than a predetermined RSRP threshold, and a measured Reference Signal Received Quality (RSRQ) of the at least one LTM candidate cell is greater than a predetermined RSRQ threshold.

6. The apparatus of aspect 1, wherein the UL scheduling grant at least comprises a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration.

7. The apparatus of aspect 1, wherein the RACH Request message comprises at least one bit indicating an availability of L1 measurement report to be sent in UL.

8. The apparatus of aspect 1, wherein the PDCCH order comprises physical cell ID (PCI) of at least one LTM candidate cell being served by the at least one candidate gNB-DU.

9. A method comprising:

receiving, from a gNodeB Distributed Unit (gNB-DU) serving a user equipment (UE) in a current serving cell, a Physical Downlink Control Channel (PDCCH) order to perform uplink synchronization with at least one Layer (L1/L2) Triggered Mobility (LTM) candidate cell of at least one candidate gNB-DU;

transmitting, in a Random Access Channel (RACH) Request message, an indication to send L1 measurement report along with RACH preamble, to the at least one LTM candidate gNB-DU serving the at least one LTM candidate cell;

receiving, a Random Access Response (RAR) message along with an uplink (UL) scheduling grant to send L1 measurement report to the at least one LTM candidate gNB-DU, either directly from the at least one LTM candidate gNB-DU or via the serving gNB-DU; and transmitting the L1 measurement report to the at least one LTM candidate gNB-DU, in response to receipt of the UL scheduling grant in the RAR message.

10. The method of aspect 9, further comprising:

transmitting the L1 measurement report to the at least one LTM candidate gNB-DU further based on a pre-configured grant for the at least one LTM candidate cell.

11. The method of aspect 9, wherein receiving the PDCCH order to perform uplink synchronization with the at least one LTM candidate cell of the at least one candidate gNB-DU comprises:

periodically performing, intra and/or inter-frequency L1 measurement for at least one LTM candidate cell; and transmitting the L1 measurement report of the at least one LTM candidate cell to the serving gNB-DU.

12. The method of aspect 9, wherein the PDCCH order to perform uplink synchronization with the at least one LTM candidate cell is received from the serving gNB-DU, if the L1 measurement report indicates at least one of:

a measured Reference Signal Received Power (RSRP) of the at least one LTM candidate cell is greater than a predetermined RSRP threshold, and a Reference Signal Received Quality (RSRQ) of the at least one LTM candidate cell is greater than a predetermined RSRQ threshold.

13. The method of aspect 9, wherein transmitting the L1 measurement report indication along with RACH preamble, to the at least one LTM candidate gNB-DU comprises:

transmitting the L1 measurement report indication along with the RACH preamble in the RACH Request message to the at least one LTM candidate gNB-DU, if the L1 measurement report indicates at least one of:

a measured Reference Signal Received Power (RSRP) of the at least one LTM candidate cell is greater than a predetermined RSRP threshold, and a measured Reference Signal Received Quality (RSRQ) of the at least one LTM candidate cell is greater than a predetermined RSRQ threshold.

14. The method of aspect 9, wherein the UL scheduling grant at least comprises a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration.

15. The method of aspect 9, wherein the RACH Request message comprises at least one bit indicating an availability of L1 measurement report to be sent in UL.

16. The method of aspect 9, wherein the PDCCH order comprises physical cell ID (PCI) of at least one LTM candidate cell being served by the at least one candidate gNB-DU.

17. A non-transitory computer-readable medium having computer-readable instructions that when executed by a processor causes the processor to perform operations of:

obtaining, from a gNodeB Distributed Unit (gNB-DU) serving a user equipment (UE) in a current serving cell, a Physical Downlink Control Channel (PDCCH) order to perform uplink synchronization with at least one Layer (L1/L2) Triggered Mobility (LTM) candidate cell of at least one candidate gNB-DU;

transmitting, in a Random Access Channel (RACH) Request message, an indication to send L1 measurement report indication along with RACH preamble, to the at least one LTM candidate gNB-DU serving the at least one LTM candidate cell;

obtaining, a Random Access Response (RAR) message along with an uplink (UL) scheduling grant, to send L1 measurement report to the at least one LTM candidate gNB-DU, either directly from the at least one LTM candidate gNB-DU or via the serving gNB-DU; and transmitting the L1 measurement report to the at least one LTM candidate gNB-DU, in response to receipt of the UL scheduling grant in the RAR message.

The invention claimed is:

1. An apparatus comprising hardware configured to:

receive, from a gNodeB Distributed Unit (gNB-DU) serving a user equipment (UE) in a current serving cell, a Physical Downlink Control Channel (PDCCH) order to perform uplink synchronization with at least one Layer (L1/L2) Triggered Mobility (LTM) candidate cell of at least one candidate gNB-DU;

transmit, in a Random Access Channel (RACH) Request message, an indication to send L1 measurement report along with RACH preamble, to the at least one LTM candidate gNB-DU serving the at least one LTM candidate cell;

receive, a Random Access Response (RAR) message along with an uplink (UL) scheduling grant, to send the L1 measurement report to the at least one LTM candidate gNB-DU, either directly from the at least one LTM candidate gNB-DU or via the serving gNB-DU; and transmit the L1 measurement report to the at least one LTM candidate gNB-DU, in response to receipt of the UL scheduling grant in the RAR message.

2. The apparatus of claim 1, wherein the hardware is configured to transmit the L1 measurement report to the at least one LTM candidate gNB-DU further based on a pre-configured or dynamic grant for the at least one LTM candidate cell.

3. The apparatus of claim 1, wherein to receive the PDCCH order to perform uplink synchronization with the at least one LTM candidate cell of the at least one candidate gNB-DU, the hardware is further configured to:

periodically perform, intra and/or inter-frequency L1 measurement for at least one LTM candidate cell; and transmit the L1 measurement report of the at least one LTM candidate cell to the serving gNB-DU.

4. The apparatus of claim 1, wherein the PDCCH order to perform uplink synchronization with the at least one LTM candidate cell is received from the serving gNB-DU, if the L1 measurement report indicates at least one of:

a measured Reference Signal Received Power (RSRP) of the at least one LTM candidate cell is greater than a predetermined RSRP threshold, and/or a measured Reference Signal Received Quality (RSRQ) of the at least one LTM candidate cell is greater than a predetermined RSRQ threshold.

5. The apparatus of claim 1, wherein to transmit the L1 measurement report indication along with RACH preamble, to the at least one LTM candidate gNB-DU, the hardware is further configured to:

transmit the L1 measurement report indication along with the RACH preamble in the RACH Request message to the at least one LTM candidate gNB-DU, if the L1 measurement report indicates at least one of:

a measured Reference Signal Received Power (RSRP) of the at least one LTM candidate cell is greater than a predetermined RSRP threshold, and a measured Reference Signal Received Quality (RSRQ) of the at least one LTM candidate cell is greater than a predetermined RSRQ threshold.

6. The apparatus of claim 1, wherein the UL scheduling grant at least comprises a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration.

7. The apparatus of claim 1, wherein the RACH Request message comprises at least one bit indicating an availability of L1 measurement report to be sent in UL.

8. The apparatus of claim 1, wherein the PDCCH order comprises physical cell ID (PCI) of at least one LTM candidate cell being served by the at least one candidate gNB-DU.

9. A method comprising:

receiving, from a gNodeB Distributed Unit (gNB-DU) serving a user equipment (UE) in a current serving cell, a Physical Downlink Control Channel (PDCCH) order to perform uplink synchronization with at least one Layer (L1/L2) Triggered Mobility (LTM) candidate cell of at least one candidate gNB-DU;

transmitting, in a Random Access Channel (RACH) Request message, an indication to send L1 measurement report along with RACH preamble, to the at least one LTM candidate gNB-DU serving the at least one LTM candidate cell;

receiving, a Random Access Response (RAR) message along with an uplink (UL) scheduling grant to send the L1 measurement report, to the at least one LTM candidate gNB-DU, either directly from the at least one LTM candidate gNB-DU or via the serving gNB-DU; and transmitting the L1 measurement report to the at least one LTM candidate gNB-DU, in response to receipt of the UL scheduling grant in the RAR message.

10. The method of claim 9, further comprising:

transmitting the L1 measurement report to the at least one LTM candidate gNB-DU further based on a dynamic or pre-configured grant for the at least one LTM candidate cell.

11. The method of claim 9, wherein receiving the PDCCH order to perform uplink synchronization with the at least one LTM candidate cell of the at least one candidate gNB-DU comprises:

periodically performing, intra and/or inter-frequency L1 measurement for at least one LTM candidate cell; and transmitting the L1 measurement report of the at least one LTM candidate cell to the serving gNB-DU.

12. The method of claim 9, wherein the PDCCH order to perform uplink synchronization with the at least one LTM candidate cell is received from the serving gNB-DU, if the L1 measurement report indicates at least one of:

a measured Reference Signal Received Power (RSRP) of the at least one LTM candidate cell is greater than a predetermined RSRP threshold, and a measured Reference Signal Received Quality (RSRQ) of the at least one LTM candidate cell is greater than a predetermined RSRQ threshold.

13. The method of claim 9, wherein transmitting the L1 measurement report indication along with RACH preamble, to the at least one LTM candidate gNB-DU comprises:

transmitting the L1 measurement report indication along with the RACH preamble in the RACH Request message to the at least one LTM candidate gNB-DU, if the L1 measurement report indicates at least one of:

a measured Reference Signal Received Power (RSRP) of the at least one LTM candidate cell is greater than a predetermined RSRP threshold, and/or a measured Reference Signal Received Quality (RSRQ) of the at least one LTM candidate cell is greater than a predetermined RSRQ threshold.

14. The method of claim 9, wherein the UL scheduling grant at least comprises a Modulation and Coding Scheme (MCS), MCS table to be used, Transport Block Size (TBS), UL power control parameters, time domain and frequency domain resource allocation, resource block group (RBG) size, periodicity and offset of grant, repetition factor of the grant, UL Demodulation Reference Signal (DMRS) configuration, and UL-precoder configuration.

15. The method of claim 9, wherein the RACH Request message comprises at least one bit indicating an availability of L1 measurement report to be sent in UL.

16. The method of claim 9, wherein the PDCCH order comprises physical cell ID (PCI) of at least one LTM candidate cell being served by the at least one candidate gNB-DU.

17. A non-transitory computer-readable medium having computer-readable instructions that when executed by a processor causes the processor to perform operations of:

obtaining, from a gNodeB Distributed Unit (gNB-DU) serving a user equipment (UE) in a current serving cell, a Physical Downlink Control Channel (PDCCH) order to perform uplink synchronization with at least one Layer (L1/L2) Triggered Mobility (LTM) candidate cell of at least one candidate gNB-DU;

transmitting, in a Random Access Channel (RACH) Request message, an indication to send L1 measurement report along with RACH preamble, to the at least one LTM candidate gNB-DU serving the at least one LTM candidate cell;

obtaining, a Random Access Response (RAR) message along with an uplink (UL) scheduling grant, to send the L1 measurement report to the at least one LTM candidate gNB-DU, either directly from the at least one LTM candidate gNB-DU or via the serving gNB-DU; and transmitting the L1 measurement report to the at least one LTM candidate gNB-DU, in response to receipt of the UL scheduling grant in the RAR message.

18. The apparatus of claim 1, wherein the hardware is configured to receive the UL scheduling grant in the RAR message in response to the indication to send L1 measurement report transmitted in the RACH Request message.

19. The method of claim 9, wherein receiving the RAR message along with the UL scheduling grant is in response to the indication to send L1 measurement report transmitted in the RACH Request message.

20. The non-transitory computer-readable medium of claim 17, wherein the operations further comprise obtaining the UL scheduling grant in the RAR message in response to the indication to send L1 measurement report transmitted in the RACH Request message.

* * * * *